(12) United States Patent
Nishiyama et al.

(10) Patent No.: US 10,860,176 B2
(45) Date of Patent: Dec. 8, 2020

(54) IMAGE CONTROL METHOD AND DEVICE

(71) Applicant: FUJITSU LIMITED, Kawasaki (JP)

(72) Inventors: Soichi Nishiyama, Ota (JP); Hiroaki Sugimura, Ota (JP); Ken Fujiki, Kawasaki (JP); Hajime Hirozumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/661,724

(22) Filed: Jul. 27, 2017

(65) Prior Publication Data

US 2018/0039386 A1 Feb. 8, 2018

(30) Foreign Application Priority Data

Aug. 4, 2016 (JP) .................................. 2016-153804

(51) Int. Cl.
*G06F 3/048* (2013.01)
*G06F 3/0482* (2013.01)
*G06F 3/01* (2006.01)
*G06F 3/0484* (2013.01)

(52) U.S. Cl.
CPC ............ *G06F 3/0482* (2013.01); *G06F 3/013* (2013.01); *G06F 3/017* (2013.01); *G06F 3/04842* (2013.01)

(58) Field of Classification Search
CPC .... G06F 3/0482; G06F 3/04842; G06F 3/017; G06F 3/013
See application file for complete search history.

(56) References Cited

U.S. PATENT DOCUMENTS

| 8,225,229 B2* | 7/2012 | Thorn ...................... G09G 5/00 715/802 |
| 2002/0077882 A1 | 6/2002 | Nishikawa et al. |
| 2005/0251760 A1 | 11/2005 | Sato et al. |

(Continued)

FOREIGN PATENT DOCUMENTS

| JP | 2001-60194 A | 3/2001 |
| JP | 2002-108946 A | 4/2002 |

(Continued)

OTHER PUBLICATIONS

Extended Search Report dated Dec. 7, 2017, issued in counterpart European Application No. 17183970.7 (7 pages).

(Continued)

*Primary Examiner* — Anil N Kumar
(74) *Attorney, Agent, or Firm* — Westerman, Hattori, Daniels & Adrian, LLP

(57) ABSTRACT

An image control method includes: acquiring detection information indicating a gaze region or a position of a user with respect to a display device displaying plural items of selection option information that are subject to a selection operation; determining whether or not the gaze region of the user indicated by the acquired detection information is in a resting state, or whether or not the position of the user indicated by the acquired detection information is within a predetermined range; and by a processor, controlling modification of a display state of items of the selection option information displayed in a specific region of the display device in accordance with a determination result based on the detection information.

13 Claims, 28 Drawing Sheets

(56) References Cited

U.S. PATENT DOCUMENTS

| | | | |
|---|---|---|---|
| 2011/0141010 A1* | 6/2011 | Sakata | A61B 3/113 345/156 |
| 2011/0267374 A1* | 11/2011 | Sakata | G06F 3/013 345/672 |
| 2013/0027302 A1* | 1/2013 | Iwaizumi | G06F 1/1686 345/158 |
| 2013/0176208 A1 | 7/2013 | Tanaka et al. | |
| 2013/0307762 A1 | 11/2013 | Ashbrook et al. | |
| 2016/0004320 A1 | 1/2016 | Lundberg et al. | |
| 2017/0038837 A1* | 2/2017 | Faaborg | G06T 7/70 |

FOREIGN PATENT DOCUMENTS

| | | |
|---|---|---|
| JP | 2006-018794 A | 1/2006 |
| JP | 2007-237986 A | 9/2007 |
| JP | 2013-140540 A | 7/2013 |
| JP | 2013-246355 A | 12/2013 |
| WO | 2014/128787 A1 | 8/2014 |

OTHER PUBLICATIONS

Office Action dated Feb. 18, 2020, issued in counterpart JP Application 2016-153804, with English translation (5 pages).
Office Action dated Oct. 6, 2020, issued in counterpart JP Application No. 2016-153804, with English Translation. (3 pages).

* cited by examiner

| CARD ID | KEYWORD | IMAGE DATA | DISPLAY POSITION | ... |
|---|---|---|---|---|
| C0001 | GOING MOBILE | c0001.jpg | (x1,y1) | |
| C0002 | GLOBAL EXPANSION | c0002.jpg | (x2,y2) | |
| ... | | | | |

FIG.8

| CARD ID | CONTROL INFORMATION | ... |
|---|---|---|
| C0001 | START TIMING: 0 secs, CYCLE 10 secs, MAXIMUM DISPLAY SIZE: m × m | |
| C0002 | START TIMING: 5 secs, CYCLE 15 secs, MAXIMUM DISPLAY SIZE: m × m | |
| ... | | |

| BACKGROUND ID | IMAGE DATA | ... |
|---|---|---|
| B0001 | b0001.jpg | |
| b0002 | b0002.jpg | |

| VISION ID | USER GROUP ID | BACKGROUND ID | CARD ID | DISPLAY POSITION | TITLE | HANDWRITTEN DATA | ... |
|---|---|---|---|---|---|---|---|
| V0001 | U0001 | B0001 | C0001 | (x1,y1) | FUTURE OF WORKING STYLES | v0001.jpg | |
| | | | C0002 | (x2,y2) | | | |
| | | | ... | | | | |
| ... | | | | | | | |

FIG.33

| CARD ID | CONTROL INFORMATION | ... |
|---------|---------------------|-----|
| c0001 | ONE PIXEL IN +x DIRECTION / ONE CYCLE | |
| c0002 | ONE PIXEL IN +x DIRECTION / ONE CYCLE | |

IMAGE CONTROL METHOD AND DEVICE

CROSS-REFERENCE TO RELATED APPLICATION

This application is based upon and claims the benefit of priority of the prior Japanese Patent Application No. 2016-153804, filed on Aug. 4, 2016, the entire contents of which are incorporated herein by reference.

FIELD

The embodiments discussed herein are related to an image control method, an image control device, and a storage medium on which an image control program is stored.

BACKGROUND

Generally, in planning and development of products and services, the rapidity and accuracy with which user desires are extracted from unprocessed comments made by the users is important. Against this backdrop, nowadays, through surveys, interviews, and the like, various investigations into user desires are proactively performed to extract user desires with regards to products and services and bring products or services that satisfy users swiftly to market. Technology has therefore been proposed for assisting the extraction of user desires.

For example, technology has been proposed that analyzes input desire information, and, based on the analyzed desire information, weights evaluation indices that are pre-stored in a storage device and that are scales for quantitatively measuring, with respect to a target product, a user's sense of potential benefit fruition that is contained within the desire information. In this technology, one or plural evaluation indices having the highest weighting are selected from plural weighted evaluation indices, and one or more product design concepts are chosen to maximize or minimize the selected evaluation indices.

Technology has also been proposed in which documents and situation information, which is appended information related to products or services to which the documents pertain, are input and analysis is performed based on morphological analysis of the input documents. In such technology, documents are converted into demand expressions indicating product or service states that users demand of products or services, according to specific conversion rules based on the situation information, and the documents and the demand expressions are associated with each other and displayed.

RELATED PATENT DOCUMENTS

Patent Document 1 Japanese Patent Application Laid-Open No. 2002-108946
Patent Document 2 Japanese Patent Application Laid-Open No. 2001-060194

SUMMARY

According to an aspect of the embodiments, an image control method includes: acquiring detection information indicating a gaze region or a position of a user with respect to a display device displaying plural items of selection option information that are subject to a selection operation; determining whether or not the gaze region of the user indicated by the acquired detection information is in a resting state, or whether or not the position of the user indicated by the acquired detection information is within a predetermined range; and, by a processor, controlling modification of a display state of items of the selection option information displayed in a specific region of the display device in accordance with a determination result based on the detection information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a control information DB;

FIG. 9 is a diagram illustrating an example of a background DB;

FIG. 10 is a diagram illustrating an example of a vision DB;

FIG. 33 is a diagram illustrating another example of a control information DB.

DESCRIPTION OF EMBODIMENTS

Detailed explanation follows regarding an example of an exemplary embodiment according to technology disclosed herein, with reference to the drawings. In each of the exemplary embodiments below, explanation is given regarding examples of cases in which, for example, desires of a user group that holds discussions in workshops or the like, with the aim of addressing problems inside and outside a company, are extracted using information and communication technology (ICT).

First Exemplary Embodiment

Figure 1:
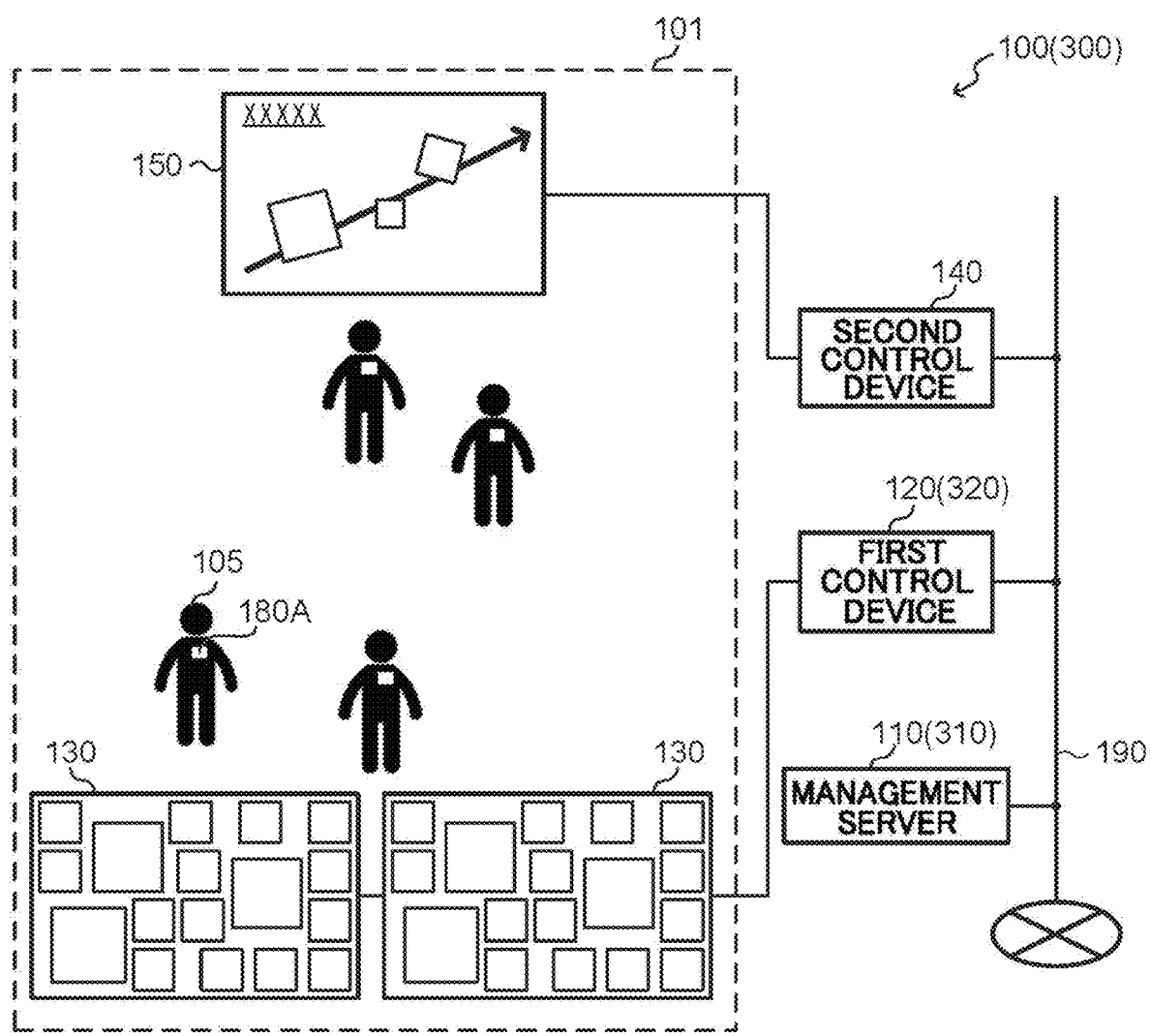
FIG. 1 is a block diagram illustrating a schematic configuration of an image control system according to a first and a third exemplary embodiment.

As illustrated in FIG. 1, an image control system 100 according to a first exemplary embodiment includes a management server 110, a first control device 120, first display devices 130, a second control device 140, and a second display device 150. As illustrated in FIG. 1, at least the first display devices 130 and the second display device 150 are placed in a room 101 where a workshop that makes use of services provided by the image control system 100 is held. Each user 105 participating in the workshop wears a position sensor 180A.

The management server 110, the first control device 120, and the second control device 140 are connected to one another by a hub 190. The connections between each device and the hub may be wired or may be wireless. The first control device 120 and the first display devices 130, and the second control device 140 and the second display device 150, are also respectively connected together, either by wire or wirelessly.

The management server 110 is an information processing device such as a general server device or a personal computer. The management server 110 manages various information employed by the image control system 100, and respectively instructs the first control device 120 and the second control device 140 to execute various processing (described in detail later).

Each first display device 130 includes a display section that displays plural selection option cards (described in detail below) and an operation section that receives operations by the user 105 with respect to the displayed selection option cards. The first display device 130 may, for example, be implemented by a touch panel display. Note that in the present exemplary embodiment, explanation is given regarding a case in which the two first display devices 130 are portable and display one screen displayed.

The first control device 120 controls display on the first display device 130, processing of information received via the first display device 130, and controls communication with the management server 110 (described in detail later).

The second display device 150 includes a display section that displays a vision (described in detail below) representing desires of users 105 using selection option cards, and an operation section that receives operations by users 105 with respect to the displayed selection option cards. The second display device 150 may, for example, be implemented by a touch panel display.

The second control device 140 controls display on the second display device 150, processes information received via the second display device 150, and controls communication with the management server 110 (described in detail later).

The position sensor 180A, for example, uses the intensity or the like of radio waves communicated between the tag wearable by the user 105 as a badge or the like and a beacon installed in a fixed position in the room 101 to measure the position of the user 105 wearing the tag. Note that the position sensor 180A may also measure the positions of the users 105 using a Global Positioning System (GPS) or Near Field Communication (NFC). The positions of the users 105 may also be measured by analyzing images captured in the room 101. The position sensor 180A outputs detection information indicating the measured position of the user 105.

Here, explanation is given regarding selection option cards and visions.

Figure 2:
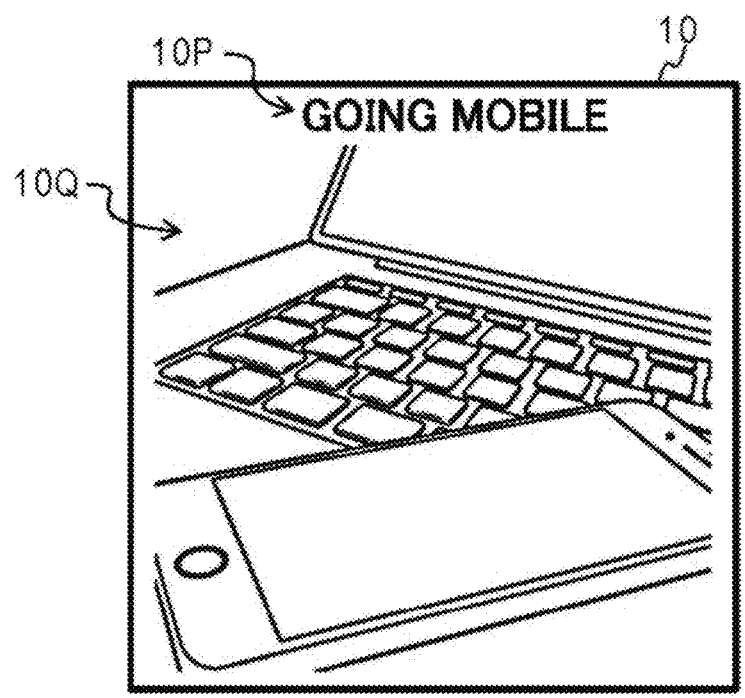
FIG. 2 is a diagram illustrating an example of a selection option card.

Selection option cards are cards in which various selection options for extracting desires of the users 105 are each electronically represented by a single card using a keyword and an image, such as a photograph or an illustration. FIG. 2 illustrates an example of a selection option card 10. In the example of FIG. 2, the selection option card 10 includes a keyword 10P and an illustration 10Q indicating the selection option represented by that selection option card 10. Various content can be applied to the selection options represented by the selection option cards 10, and examples include content related to facilities, content related to work methods, content in which ICT may be employable, and content unrelated to ICT. Moreover, the selection option card 10 may include the keyword 10P alone or the illustration 10Q alone.

Figure 3:
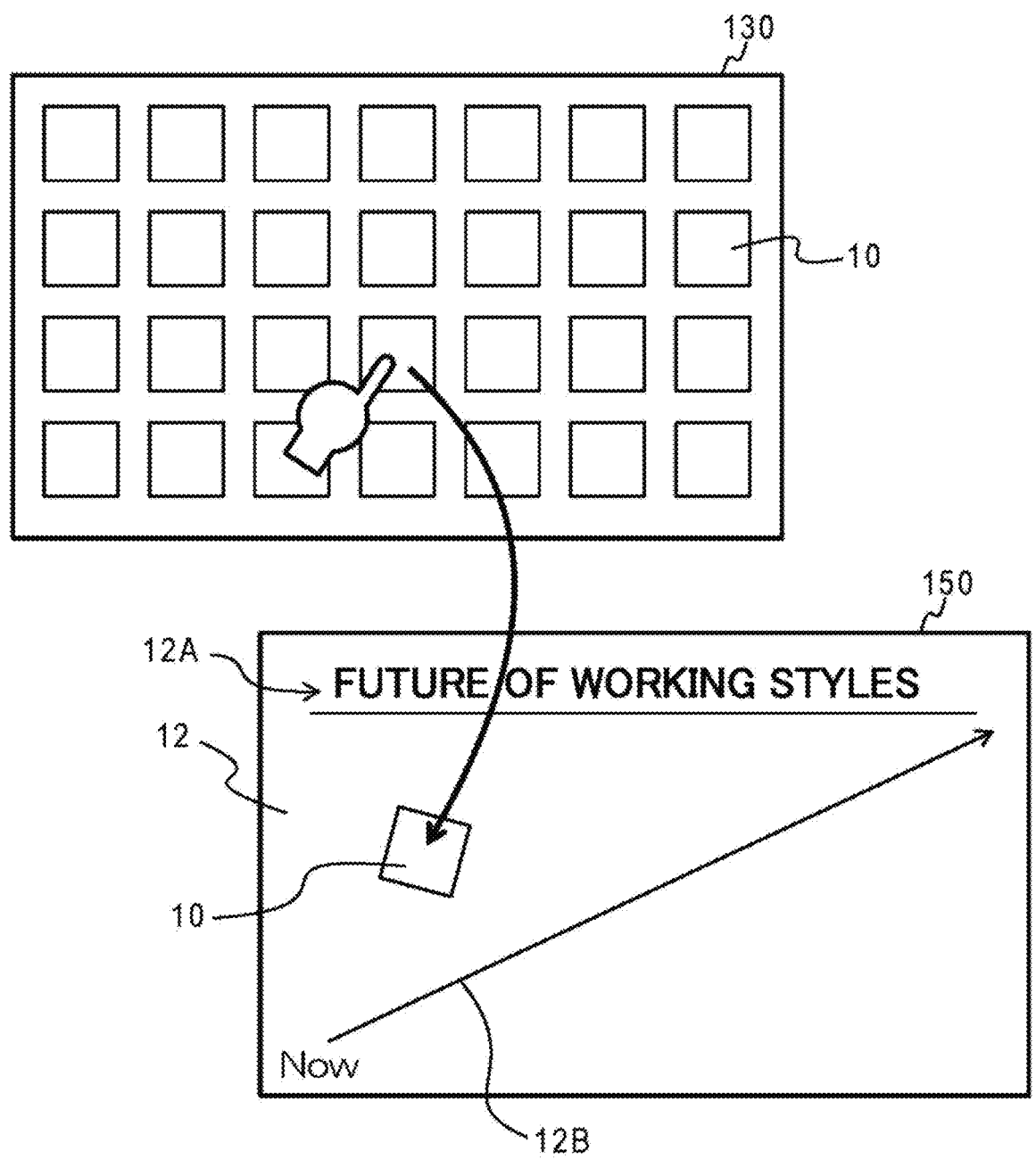
FIG. 3 is a diagram for explaining selection option cards and visions.

The selection option cards 10 prepared corresponding to the number of selection options, and, as illustrated in the upper part of FIG. 3, the plural selection option cards 10 are displayed on the first display device 130 in a state enabling operations, including selection operations, to be received from the user 105. The selection option cards 10 that are to be displayed on the first display device 130 may be all of the prepared selection option cards 10, or may be some prepared the selection option cards 10. The user 105 views the plural selection option cards 10 displayed on the first display device 130, and selects a selection option card 10 relating to their own desires.

Note that the selection option cards 10 are an example of selection option information of technology disclosed herein.

Figure 4:
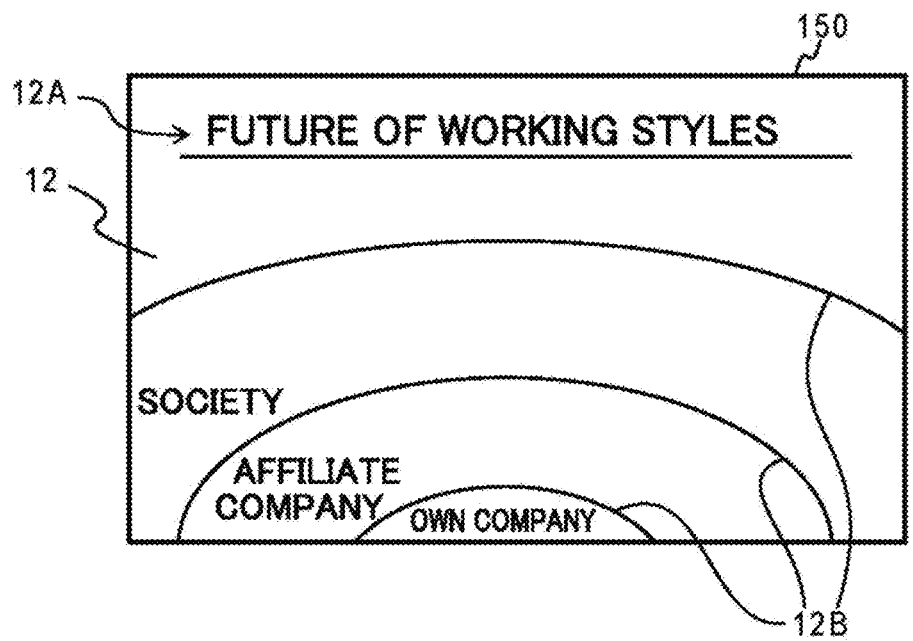
FIG. 4 is a diagram illustrating another example of a background axis.
Figure 5:
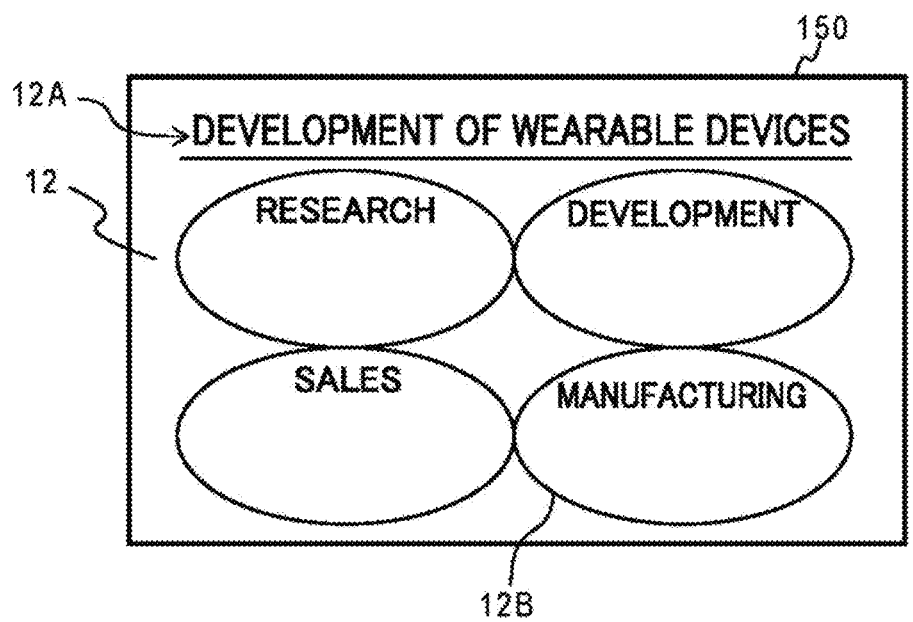
FIG. 5 is a diagram illustrating another example of a background axis.

A vision is a type of graphic modeling desires of the users 105 using the selection option cards 10. A vision, as illustrated in the lower part of FIG. 3, includes a background 12 selected according to a desire of a user 105. The background 12 includes a region 12A for inputting a title, and an axis 12B representing the passage of time or the like. In the example in the lower part of FIG. 3, a time axis spanning from the present into the future is employed as an example of the axis 12B. There is no limitation the axis 12B representing a long-term time axis as illustrated in the example in the lower part of FIG. 3, and the axis 12B may represent a single day as "morning", "noon", and "night" on a time axis. Moreover, the axis 12B is not limited to representing the passage of time, and axes 12B may, for example, be used to represent different roles such as "own company", "affiliate company", and "society", as illustrated in FIG. 4. Moreover, as illustrated in FIG. 5, the axes 12B may represent different divisions, such as "research", "development", "manufacturing", and "sales". Other examples that axes 12B may be used to represent include different places such as "in-office", "another office", and "outside the company".

As illustrated in the lower part of FIG. 3, selection option cards 10 selected on the first display device 130 are displayed over the background 12 displayed on the second display device 150. A user 105 considers the axis 12B and places the displayed selection option cards 10 at appropriate positions. A vision representing desires of the user 105 is thus drawn up by placing the selection option cards 10 on the background 12 that includes the axis 12B. The vision may also be drawn using hand-drawing tools.

More detailed explanations follow regarding the management server 110, the first control device 120, and the second control device 140.

Figures 6, 7:
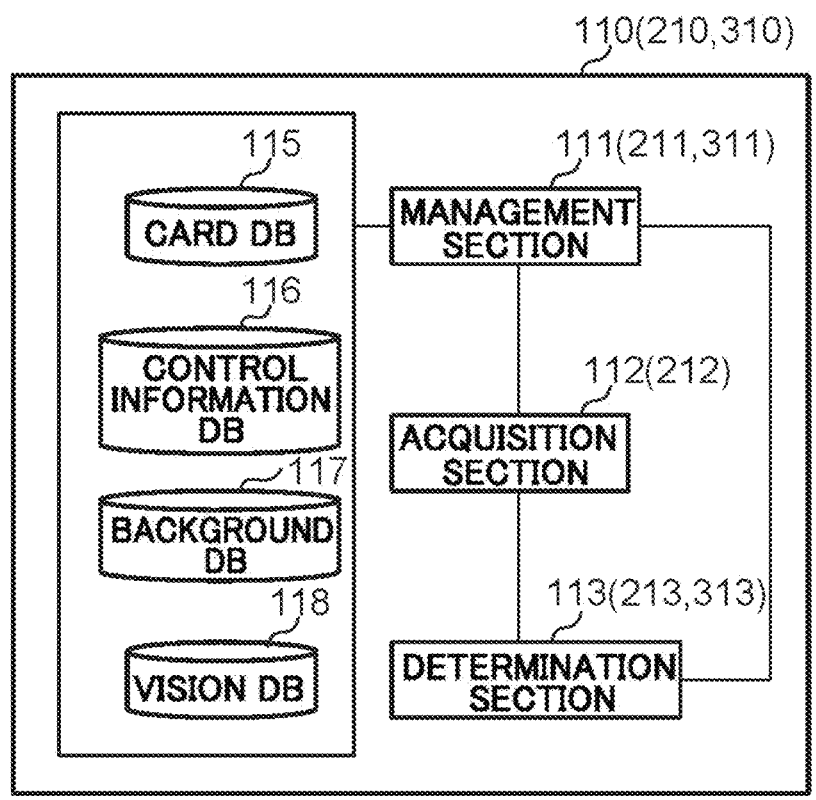
FIG. 6 is a functional block diagram illustrating a schematic configuration of a management server.
FIG. 7 is a diagram illustrating an example of a card database (DB)

First, explanation follows regarding the management server 110. As illustrated in FIG. 6, the management server 110 includes a management section 111, an acquisition section 112, and a determination section 113 as functional sections. A card database (DB) 115, a control information DB 116, a background DB 117, and a vision DB 118 are stored in specific storage regions of the management server 110.

Explanation follows regarding the various databases stored in the specific storage region of the management server 110.

The card DB 115 is stored with card information for each of the selection option cards 10. FIG. 7 illustrates an example of the card DB 115. In the example of FIG. 7, each row corresponds to card information for a single selection option card 10. Each item of card information includes information such as a "card ID" that is identification information of the selection option card 10, a "keyword" displayed on the selection option card 10, and "image data" such as a photograph or illustration displayed on the selection option card 10. The respective card information also includes information of a "display position" for when the selection option card 10 is displayed on the first display device 130. For example, an xy-coordinate system is set with the origin at the upper left corner of a display region of the first display device 130; with the direction toward the right as the positive x-axis direction, and the downward direction as the positive y-axis direction. Which point in the display region to use as the origin may be decided by the system designer, and, for example, the center of the display region may be set as the origin. Moreover, a display position of a reference point of the selection option card 10 (for example, the upper left corner) may be expressed using coordinate values in the xy-coordinate system set for the display region of the first display device 130. Which point within the selection option card 10 to use as the reference point may be decided by the system designer, and, for example, the center of the selection option card 10 may be used as the reference point.

When the selection option cards 10 are displayed on the first display device 130, control information is stored in the control information DB 116 for performing control such that the display state of each selection option card 10 changes with the passage of time. FIG. 8 illustrates an example of the control information DB 116. In the example of FIG. 8, each row corresponds to control information for a single selection option card 10. FIG. 8 illustrates an example in which the display sizes of selection option cards 10 change from a predetermined initial display size with the passage of time.

Note that control information may be registered in the control information DB 116 for all of the selection option cards 10 registered in the card DB 115, or control information may be registered in the control information DB 116 for a portion of the selection option cards 10 registered in the card DB 115. Selection option cards 10 that have no control information registered in the control information DB 116 are simply displayed on the first display device 130 at the initial display size without the display size being modified with the passage of time. When control information is registered for a portion of the selection option cards 10, that portion of selection option cards 10 may be selected at random from the selection option cards 10 registered in the card DB 115. Moreover, configuration may be made such that history of selection option cards 10 selected in previous workshops is retained, and the portion of the selection option cards 10 is selected based on the frequency of selection or the like. Moreover, attribute information indicating attributes such as division, place, and time related to that selection option card 10 are associated with each selection option card 10. Selection option cards 10 associated with related attribute information may be selected as the portion of the selection option cards 10 in accordance with the object of the workshop or attributes of user groups.

The background DB 117 is stored with information regarding respective backgrounds 12 for display on the second display device 150. FIG. 9 illustrates an example of the background DB 117. In the example of FIG. 9, each row corresponds to background information for a single background 12. Each item of background information includes information such as a "background ID" serving as identification information of the background 12, and "image data" of the background 12 that includes the axis 12B.

The vision DB 118 is stored with vision information generated by the users 105 on the second display device 150. FIG. 10 illustrates an example of the vision DB 118. In the example of FIG. 10, each row corresponds to vision information representing a single vision. Each item of vision information includes information such as a "vision ID" serving as identification information of the vision, a "user group ID" serving as identification information of the user group that generated the vision, and "background ID" of the background 12 to display on the second display device 150. Moreover, the vision information includes information such as the "card IDs" of the selection option cards 10 that were included in the vision, and the "display positions" indicating the positions at which the respective selection option cards 10 were displayed on the background 12. The "display position" can be represented using a coordinate value on an xy-coordinate system set for the background 12 region displayed on the second display device 150, similarly to the display position of the selection option card 10 displayed on the first display device 130 described above. The vision information further includes information such as a "title", input as text data, and "handwritten data" representing an image that was drawn using a handwriting tool. Note that the title may also be input as handwritten data.

When a single user group has generated plural types of vision, plural items of vision information, respectively associated with plural different vision IDs, are stored associated with the user group ID of that user group. Note that different visions refer to visions in which any out of the background 12, the selection option cards 10 included in the vision, the placement of the selection option cards 10 on the background 12, hand-drawn drawings, or the like, differ from each other.

The vision DB 118 may be stored with data items other than those illustrated in FIG. 10 associated with the vision IDs. For example, information indicating the date and time at which the vision was stored may be stored.

Next, explanation follows regarding each functional section of the management server 110.

When instructed to start the service provided by the image control system 100, the management section 111 acquires the card information of each of the selection option cards 10 from the card DB 115, and acquires control information from the control information DB 116. The management section 111 transmits the acquired card information and control information to the first control device 120.

The management section 111 also acquires one item of background information from the background DB 117 and transmits the background information to the second control device 140. The background information transmitted to the second control device 140 may be predetermined background information, may be randomly selected background information, or may be background information selected by a user 105.

Moreover, when there has been a notification from the determination section 113 that the position of the user 105 is within a predetermined range, the management section 111 transmits a stop instruction for the modification control of the display state to the first control device 120 (described in detail later). Moreover, when there has been a notification from the determination section 113 that the user 105 is not present within the predetermined range, the management section 111 transmits a resume instruction for the modification control of the display state to the first control device 120 (described in detail later).

When the management section 111 has received the vision information transmitted from the second control device 140, the management section 111 appends a vision ID to the received vision information, and stores the received vision information in the vision DB 118.

The acquisition section 112 acquires the detection information output from each of the position sensors 180A worn by the respective users 105, and passes the acquired detection information to the determination section 113.

Figure 11:
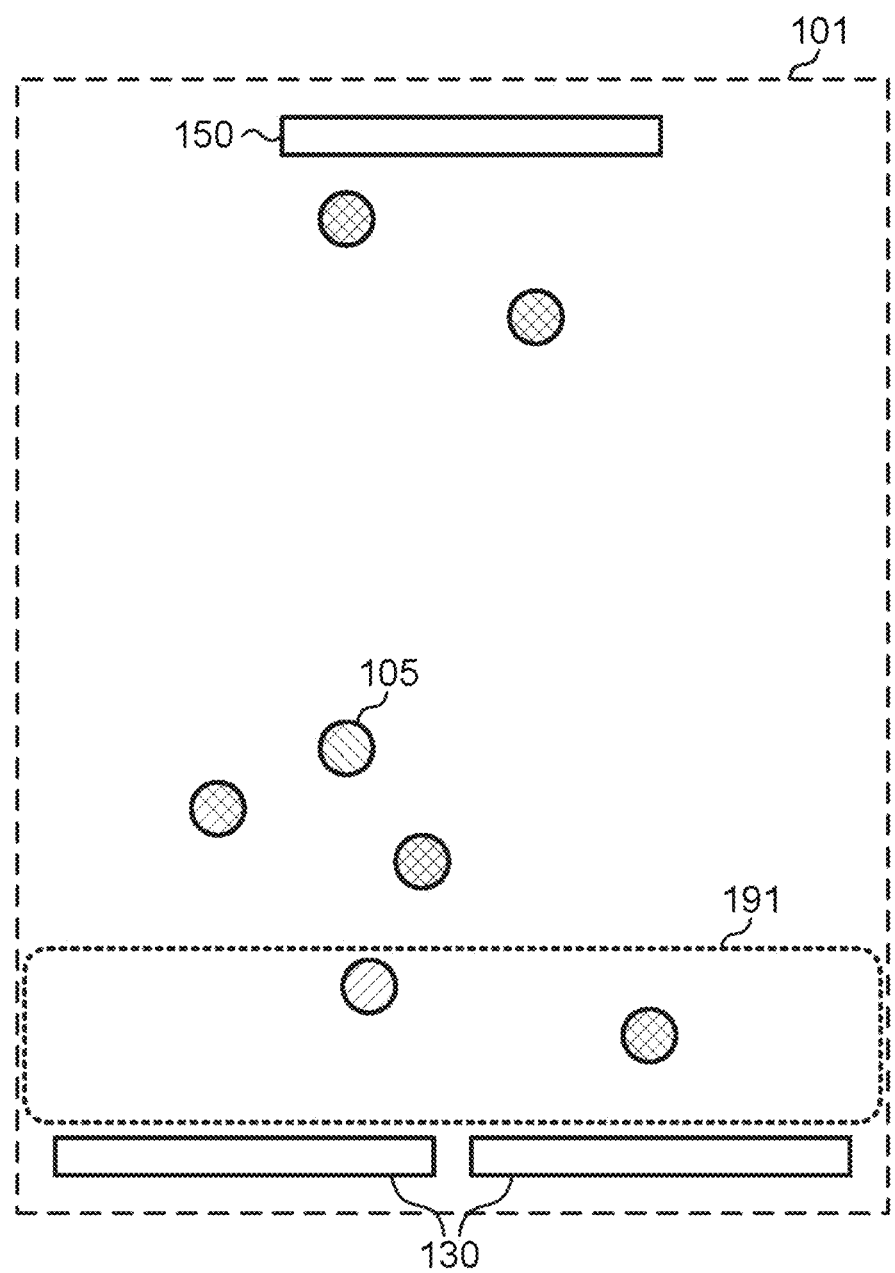
FIG. 11 is a diagram for explaining a predetermined range of the first exemplary embodiment.

The determination section 113 identifies the position of each user 105 based on the detection information passed from the acquisition section 112, and determines whether or not the position of any of the user 105 is within the predetermined range of the room 101. The predetermined range is a range close to the installation position of the first display devices 130. For example, as illustrated in FIG. 11, a range of no greater than a distance from the first display devices 130 at which a first display device 130 can be touched operated by the user 105 (for example, 60 cm) can be set as a predetermined range 191.

Users 105 present in the predetermined range 191 can be considered to be in a state of either viewing one of the selection option cards 10, or performing or intending to perform a selection operation on the selection option cards 10. Such work by users is referred to as "selection work" hereafter. When the user 105 is in a selection work state, the display state of a selection option card 10 that the user is targeting for a selection operation could be modified without regard for the intention of the user in some cases due to continuing modification control of the display state such that the display states of the selection option cards 10 displayed on the first display device 130 are changed with the passage of time. Selection work on the selection option cards 10 by the user 105 is thus hindered in some cases.

Accordingly, the determination section 113 notifies the management section 111 that the position of the user 105 is within the predetermined range 191. A stop instruction for the modification control of the display state of the selection option cards 10 is thereby transmitted from the management section 111 to the first control device 120 and the modification control of the display state of the selection option cards 10 is stopped, as described above.

The determination section 113 notifies the management section 111 that there is no longer a user 105 present in the range 191 in cases in which no user 105 is present in the predetermined range 191. A resume instruction for the modification control of the display state of the selection option cards 10 is thereby transmitted from the management section 111 to the first control device 120 and the modification control of the display state of the selection option cards 10 is resumed, as described above.

Figure 12:
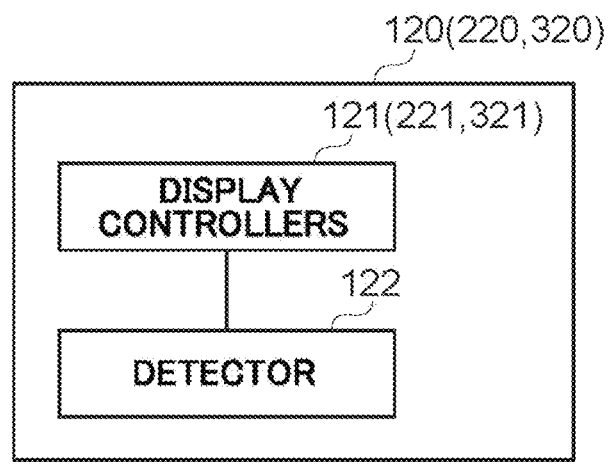
FIG. 12 is a functional block diagram illustrating a schematic configuration of a first control device.

Next, explanation follows regarding the first control device 120. As illustrated in FIG. 12, the first control device 120 includes a display controller 121 and a detector 122 as functional sections.

The display controller 121 receives the card information and control information transmitted from the management server 110, and controls such that each selection option card 10 indicated by the card information is displayed on the first display device 130 at a predetermined initial display size. The initial display size may be a fixed value, or may be a size calculated such that a specific number of selection option cards 10 are displayed on the first display device 130.

The display controller 121 performs modification control of the display state to change the display state of each selection option card 10 with the passage of time based on the control information. In the present exemplary embodiment, explanation follows regarding a case in which repeated expanding and shrinking of the display size serves as an example of modification control of the display state. More specifically, the display controller 121 starts display of the selection option card 10 on the first display device 130 and starts modification control of the display state at a timing at which a time defined by a "start timing" in the control information time has elapsed. The display controller 121 repeatedly executes expanding and shrinking of the display size of the selection option card 10 indicated by the control information such that the display size goes from the initial display size, to a display size defined by a "maximum display size" in the control information, and returns to the initial display size in this series. The display controller 121 gradually modifies the display size of the selection option card 10 so as to execute one series of expanding and shrinking of the display size over a time defined by a "period" in the control information.

For example, the display controller 121 expands the selection option card 10 by a predetermined number of pixels at a time vertically and horizontally up to the "maximum display size", and shrinks the selection option card 10 from the "maximum display size" by the predetermined number of pixels at a time vertically and horizontally down to the initial display size. Moreover, the display controller 121 may expand and shrink by a specific ratio (for example, 1.1) with respect to the current display size of the selection option card 10. The condition of expanding and shrinking of the display size in series is thereby displayed with animation.

When modifying the display size of each selection option card 10, the display controller 121 adjusts the position of each selection option card 10 such that the selection option cards 10 do not overlap with each other. Adjustment of the positions of the selection option cards 10 may employ conventionally known technology for ideal placement of images or the like. Note that configuration may be made such that overlapping of the selection option cards 10 is permitted and one overlapping selection option card 10 is displayed superimposed on another selection option card 10.

Changing the display state of the selection option card 10 with the passage of time accordingly facilitates drawing a selection option card 10 to the attention of the user 105 since this causes movement on the screen.

The display controller 121 repeatedly executes the modification control of the display state, which was started temporarily, until a stop instruction for the modification control of the display state is received. When the display controller 121 has received a stop instruction for the modification control of the display state from the management server 110, the display controller 121 stops the modification control of the display state for each selection option card 10. More specifically, the display controller 121 fixes the display size of each selection option card 10 at the current display size or at the initial display size.

As described above, the stop instruction for the modification control of the display state is transmitted from the management server 110 in cases in which the user 105 is present in the range 191, which is close to the first display device 130. Namely, this represents a state in which the user 105 is envisaged to be performing selection work on a selection option card 10. Stopping modification control of the display state of the selection option card 10 displayed on the first display device 130 in such states prevents selection work on the selection option cards 10 by the user 105 present in the range 191 from being hindered.

When the display controller 121 has received a resume instruction for the modification control of the display state from the management server 110, the display controller 121 resumes the modification control of the display state that had been stopped.

Although the screen on which the first display device 130 displays is used by all users 105 participating in a workshop, in some cases, a specific user 105 will want exclusive use when, for example, carefully looking at and selecting a selection option card 10 of interest for inspection. Switching between a public mode that is a display state applicable when used by all users 105 and a personal mode that is a display state for a specific user 105 is achieved by switching the display state of the selection option card 10 in accordance with the position of the user 105 as described above. Namely, a region where display is performed to facilitate drawing attention to a selection option card 10 is a display region for a public mode and a region in which the user 105 is expected to be performing a selection operation is a display region for a personal mode.

The detector 122 detects a selection operation by a user 105 with respect to the selection option cards 10 displayed on the first display device 130. Specifically, the detector 122 detects whether or not a specific duration (for example 3 seconds) during which a user 105 continuously touches a selection option card 10 has elapsed. When the detector 122 has detected that continuous touching for the specific duration has elapsed, card information of the touched selection option card 10 is forwarded to the second control device 140. Note that the manner in which a selection operation of a selection option card 10 is detected is not limited to the above example. For example, configuration may be made such that a function menu screen is displayed when a touch operation of a selection option card 10 has been received, and an operation instruction indicating "select a selection option card" is received from the display function menu screen.

Figure 13:
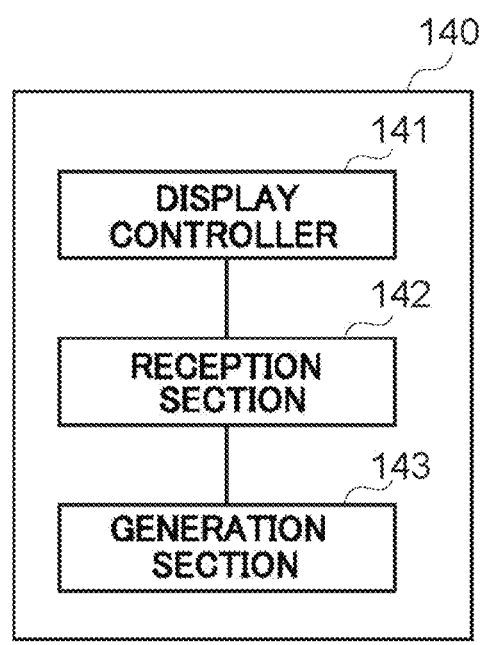
FIG. 13 is a functional block diagram illustrating a schematic configuration of a second control device.

Next, explanation follows regarding the second control device 140. As illustrated in FIG. 13, the second control device 140 includes a display controller 141, a reception section 142, and a generation section 143 as functional sections.

When the display controller 141 has received background information transmitted from the management server 110, the display controller 141 displays the background 12 indicated by the received background information on the second display device 150. Moreover, when the display controller 141 has received card information from the first control device 120, the display controller 141 displays the selection option cards 10 indicated by the received card information on the background 12. The positions at which the selection option cards 10 are displayed may be chosen at random, or the selection option cards 10 may be displayed at predetermined positions.

Moreover, when the display controller 141 has been notified of received information (described in detail below) from the reception section 142, the display controller 141 modifies the display positions and display sizes of the selection option cards 10, displays input text data, displays drawn images, and the like based on the received information.

The reception section 142 receives user 105 operations such as modifications to the display positions and modifications to the display sizes of the selection option cards 10 displayed on the second display device 150, input of text data, and drawings made using the handwriting tool. The reception section 142 notifies the received information indicating contents of the received user 105 operations to the display controller 141.

When the generation section 143 has been instructed to finalize a vision by the users 105, the generation section 143 acquires the display position of each of the selection option cards 10 on the background 12 displayed on the second display device 150. The generation section 143 then generates vision information including the background ID of the background 12 displayed on the second display device 150, the card IDs of the selection option cards 10, the requested display positions of the selection option cards 10, the input text data, and the drawn handwritten data. The generation section 143 acquires the user group ID of the user group that created the vision from login information, registration information employed when the system was used, or the like; appends the user group ID to the generated vision information; and transmits the vision information to the management server 110.

Figure 14:
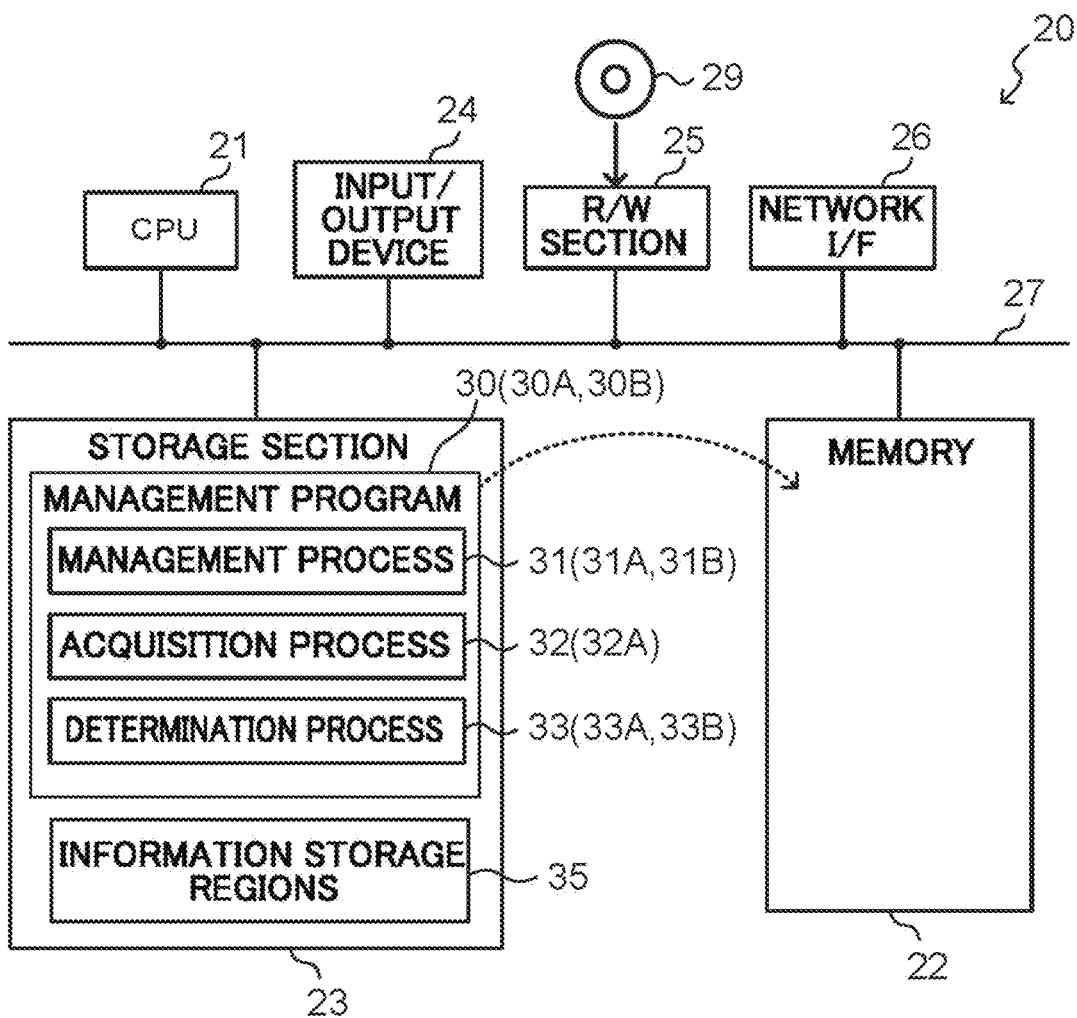
FIG. 14 is a block diagram illustrating a schematic configuration of a computer that functions as a management server.

The management server 110 may, for example, be implemented by the computer 20 illustrated in FIG. 14. The computer 20 includes a central processing unit (CPU) 21, memory 22 serving as a temporary storage region, and a non-volatile storage section 23. The computer 20 includes an input/output device 24, a read/write (R/W) section 25 that controls reading data from and writing data to a recording medium 29, and a network interface (I/F) 26 connected to a network such as the Internet. The CPU 21, the memory 22, the storage section 23, the input/output device 24, the R/W section 25, and the network I/F 26 are connected to one another through a bus 27.

The storage section 23 may be implemented by a hard disk drive (HDD), a solid state drive (SSD), flash memory, or the like. A management program 30 that causes the computer 20 to function as the management server 110 is stored in the storage section 23, which serves as a storage medium. The management program 30 includes a management process 31, an acquisition process 32, and a determination process 33. The storage section 23 includes an information storage region 35 storing items of information that respectively configure the card DB 115, the control information DB 116, the background DB 117, and the vision DB 118.

The CPU 21 reads the management program 30 from the storage section 23, expands the management program 30 into the memory 22, and sequentially executes the processes included in the management program 30. The CPU 21 operates as the management section 111 illustrated in FIG. 6 by executing the management process 31. The CPU 21 also operates as the acquisition section 112 illustrated in FIG. 6 by executing the acquisition process 32. The CPU 21 also operates as the determination section 113 illustrated in FIG. 6 by executing the determination process 33. The CPU 21 respectively reads the items of information from the information storage regions 35, and respectively expands the card DB 115, the control information DB 116, the background DB 117, and the vision DB 118 into the memory 22. The computer 20, which executes the management program 30, thereby functions as the management server 110.

Figure 15:
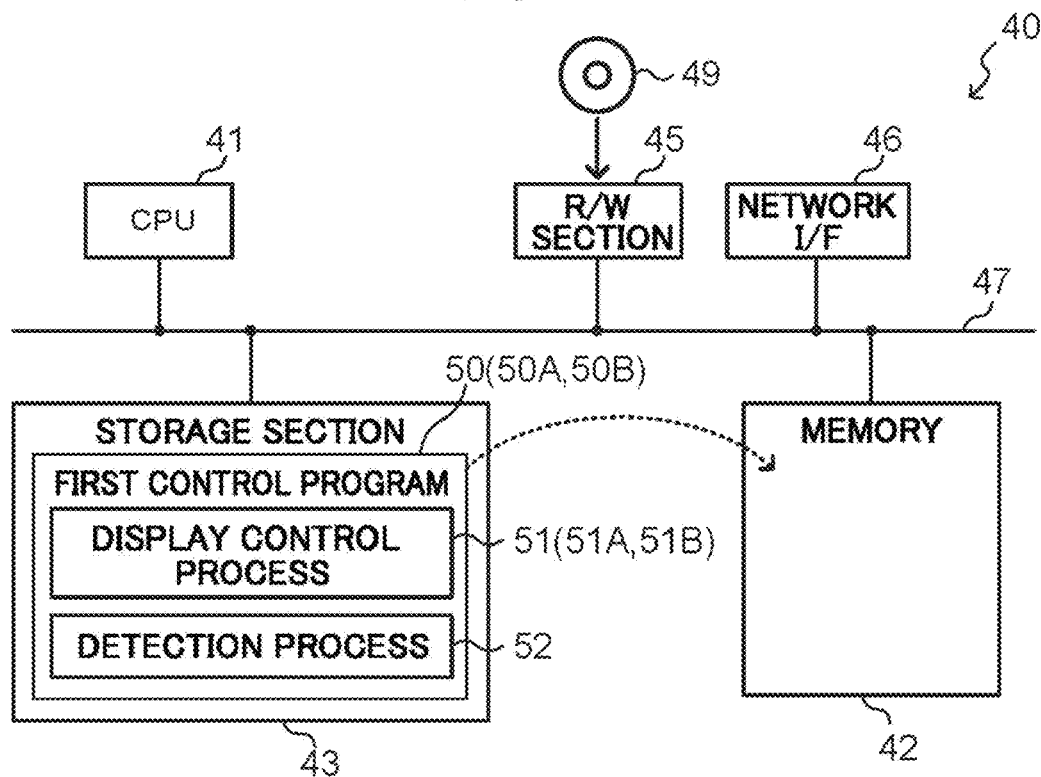
FIG. 15 is a block diagram illustrating a schematic configuration of a computer that functions as a first control device.

The first control device 120 may, for example, be implemented by the computer 40 illustrated in FIG. 15. The computer 40 includes a CPU 41, memory 42 serving as a temporary storage region, and a non-volatile storage section 43. The computer 40 further includes an R/W section 45 that controls reading data from and writing data to a recording medium 49, and a network I/F 46. The CPU 41, the memory 42, the storage section 43, the R/W section 45, and the network I/F 46 are connected to one another through a bus 47. Moreover, the computer 40 is connected to the first display device 130 through the network I/F 46.

The storage section 43 may be implemented by an HDD, an SSD, flash memory, or the like. A first control program 50 for causing the computer 40 to function as the first control device 120 is stored in the storage section 43, which serves as a storage medium. The first control program 50 includes a display control process 51 and a detection process 52.

The CPU 41 reads the first control program 50 from the storage section 43, expands the first control program 50 into the memory 42, and sequentially executes the processes included in the first control program 50. The CPU 41 operates as the display controller 121 illustrated in FIG. 12 by executing the display control process 51. The CPU 41 also operates as the detector 122 illustrated in FIG. 12 by executing the detection process 52. The computer 40, which executes the first control program 50, thereby functions as the first control device 120.

Figure 16:
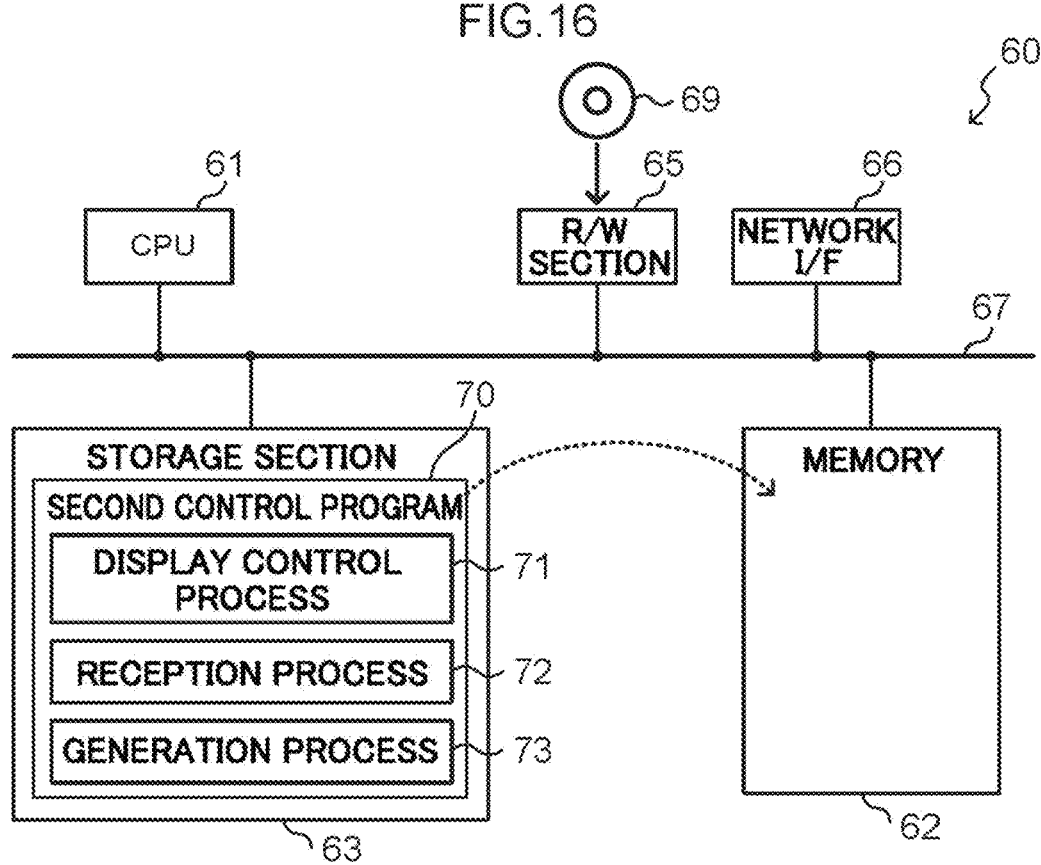
FIG. 16 is a block diagram illustrating a schematic configuration of a computer that functions as a second control device.

The second control device 140 may, for example, be implemented by the computer 60 illustrated in FIG. 16. The computer 60 includes a CPU 61, memory 62 serving as a temporary storage region, and a non-volatile storage section 63. The computer 60 further includes an R/W section 65 that controls reading of data from and writing of data to a recording medium 69, and a network I/F 66. The CPU 61, the memory 62, the storage section 63, the R/W section 65, and the network I/F 66 are connected to one another through a bus 67. Moreover, the computer 60 is connected to the second display device 150 via the network I/F 66.

The storage section 63 may be implemented by an HDD, an SSD, flash memory, or the like. A second control program 70 for causing the computer 60 to function as the second control device 140 is stored in the storage section 63, which serves as a storage medium. The second control program 70 includes a display control process 71, a reception process 72, and a generation process 73.

The CPU 61 reads the second control program 70 from the storage section 63, expands the second control program 70 into the memory 62, and sequentially executes the processes included in the second control program 70. The CPU 61 operates as the display controller 141 illustrated in FIG. 13 by executing the display control process 71. The CPU 61 also operates as the reception section 142 illustrated in FIG. 13 by executing the reception process 72. The CPU 61 also operates as the generation section 143 illustrated in FIG. 13 by executing the generation process 73. The computer 60, which executes the second control program 70, thereby functions as the second control device 140.

Note that the functionality respectively implemented by the management program 30, the first control program 50, and the second control program 70, may, for example, be implemented by semiconductor integrated circuits, and more specifically, by application specific integrated circuits (ASIC) or the like.

Figure 17:
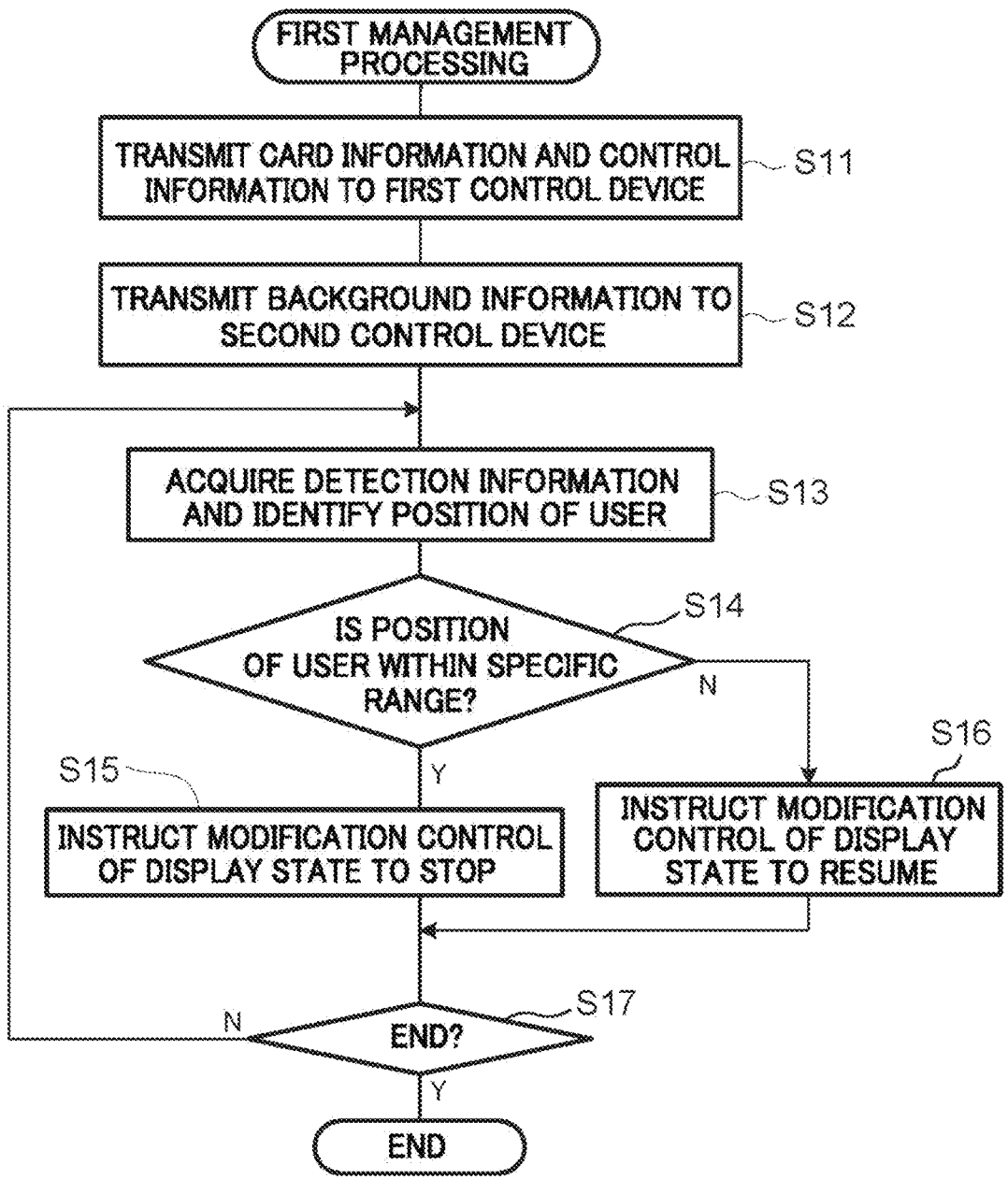
FIG. 17 is a flowchart illustrating an example of first management processing of the first exemplary embodiment.
Figure 18:
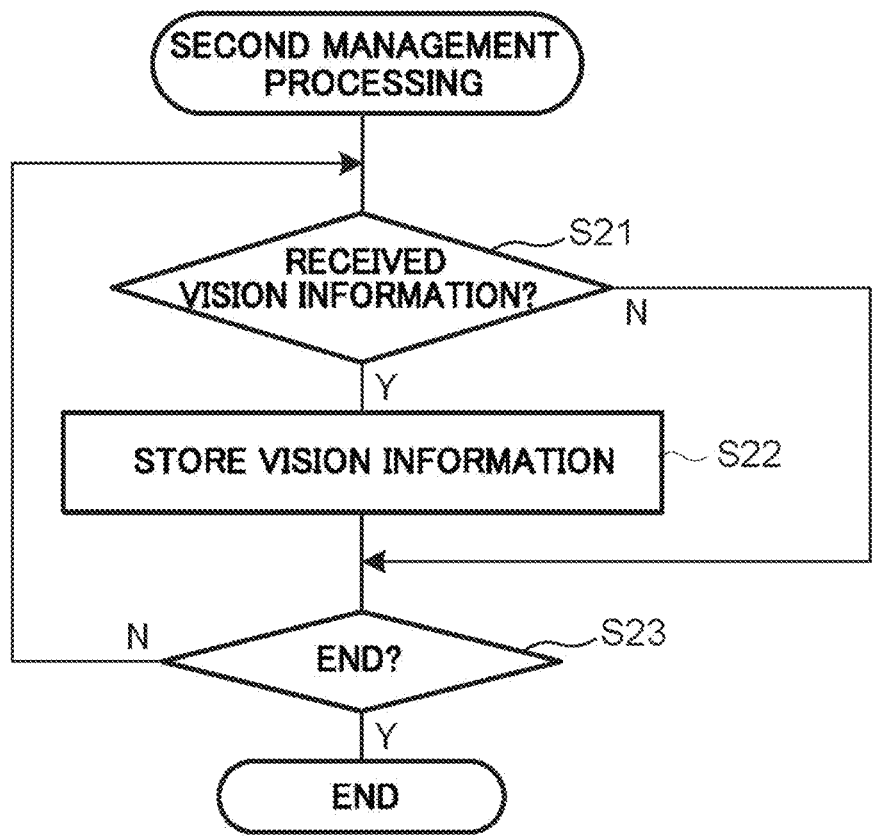
FIG. 18 is a flowchart illustrating an example of second management processing.
Figure 19:
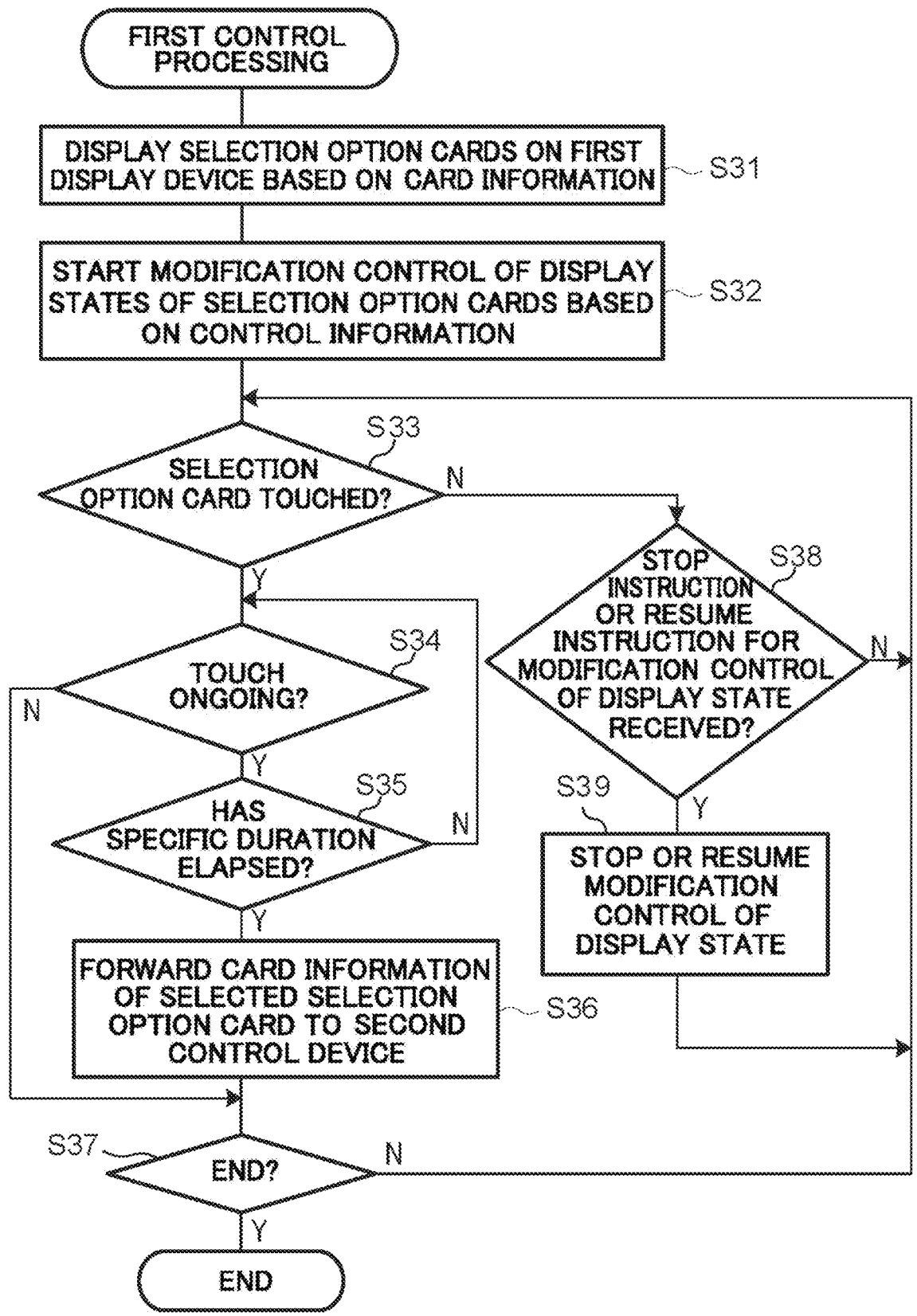
FIG. 19 is a flowchart illustrating an example of first control processing of the first and a second exemplary embodiment.
Figure 23:
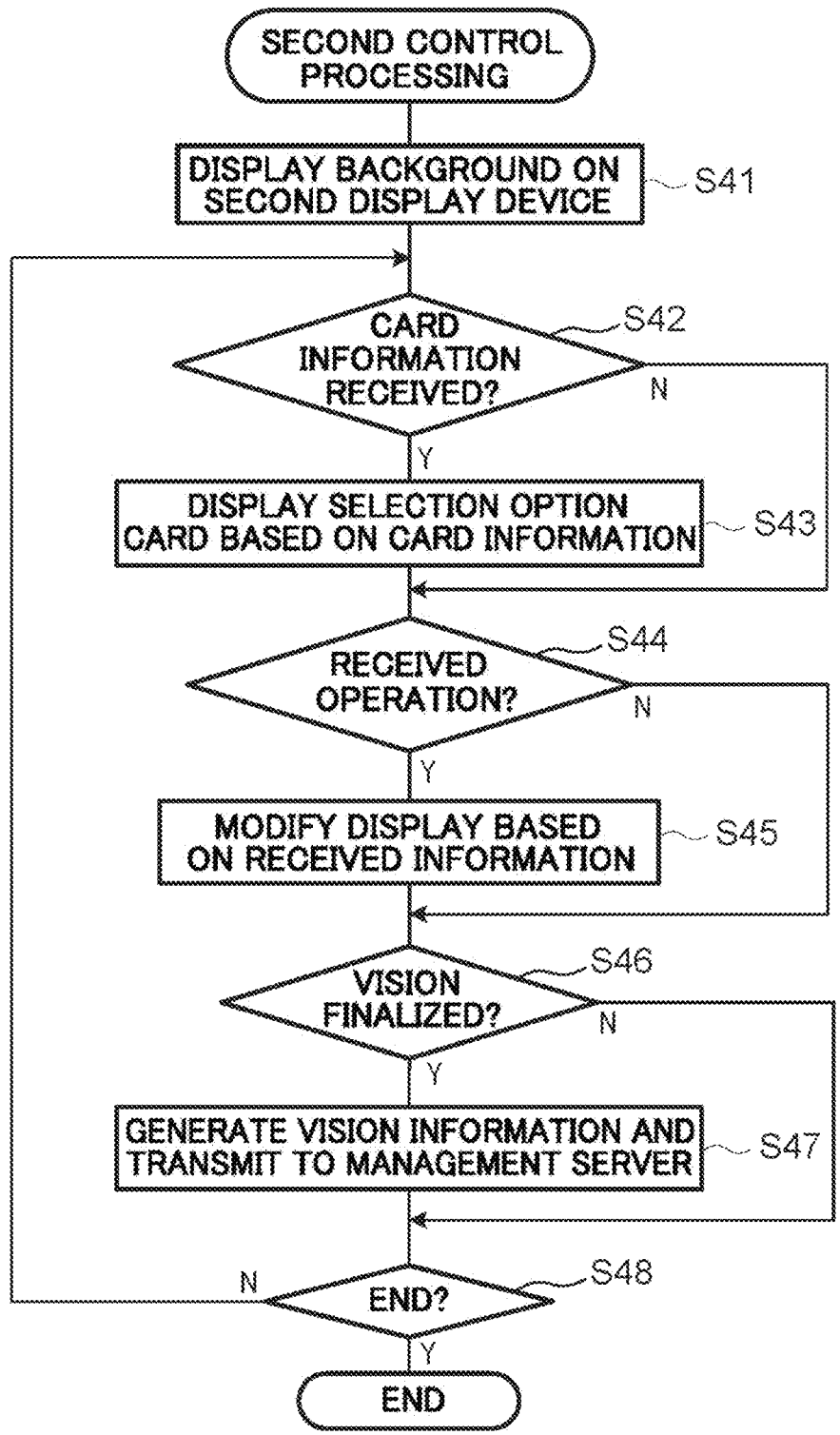
FIG. 23 is a flowchart illustrating an example of second control processing.

Next, explanation follows regarding operation of the image control system 100 according to the first exemplary embodiment. When there has been an instruction to start a service provided by the image control system 100, the first management processing illustrated in FIG. 17 is executed by the management server 110. The second management processing illustrated in FIG. 18 is also executed by the management server 110. Moreover, the first control processing illustrated in FIG. 19 is executed in the first control device 120. Moreover, the second control processing illustrated in FIG. 23 is executed in the second control device 140. Detailed description regarding each processing follows. Note that the first management processing, the first control processing, and the second control processing, are examples of image control methods of technology disclosed herein.

First, explanation follows regarding the first management processing illustrated in FIG. 17. At step S11, the management section 111 acquires card information of each of the selection option cards 10 from the card DB 115 and acquires control information from the control information DB 116. The management section 111 then transmits the acquired card information and control information to the first control device 120.

Next, at step S12, the management section 111 acquires an item of background information from the background DB 117, and transmits the acquired background information to the second control device 140.

Next, at step S13, the acquisition section 112 acquires detection information output from each of the position sensors 180A worn by each of the users 105, and passes the acquired detection information to the determination section 113. The determination section 113 identifies the position of each user 105 based on the detection information passed from the acquisition section 112.

Next, at step S14, the determination section 113 determines whether or not the position of any of the users 105 is within the predetermined range 191. Processing transitions to step S15 in cases in which the position of any of the users 105 is within the range 191, or processing transitions to step S16 in cases in which the position of none the users 105 is within the predetermined range 191.

At step S15, the determination section 113 notifies the management section 111 that the position of the user 105 is within the predetermined range 191. The management section 111 then transmits a stop instruction for the modification control of the display state of the selection option cards 10 to the first control device 120.

However, at step S16, the determination section 113 notifies the management section 111 that no user 105 is present within the predetermined range 191. The management section 111 then transmits a resume instruction for the modification control of the display state of the selection option cards 10 to the first control device 120.

Next, at step S17, the management section 111 determines whether or not an instruction to end the service provided by the image control system 100 has been given; processing returns to step S13 in cases in which an instruction to end the service has not been given, and the first management processing ends in cases in which an instruction to end the service has been given.

Note that the processing of step S15 and step S16 above may be skipped in cases in which a state in which a user 105 is present or not present within the predetermined range 191 continues and the determination result at step S14 above is the same as the previous determination result. Namely, it is sufficient to execute step S15 when a user 105 has entered the predetermined range 191, and to execute step S16 when a user 105 has left the predetermined range 191.

Next, explanation follows regarding the second management processing illustrated in FIG. 18. At step S21, the management section 111 determines whether or not vision information transmitted from the second control device 140 has been received. In cases in which vision information has been received, processing transitions to step S22, and the management section 111 appends a vision ID to the received vision information, and stores the received vision information in the vision DB 118. Processing transitions to step S23 in cases in which vision information has not been received.

Next, at step S23, the management section 111 determines whether or not an instruction to end the service provided by the image control system 100 has been given; processing returns to step S21 in cases in which an instruction to end the service has not been given, and the second management processing ends in cases in which an instruction to end the service has been given.

Next, explanation follows regarding the first control processing illustrated in FIG. 19. The first control processing initiates when the first control device 120 has received the card information and the control information transmitted from the management server 110.

At step S31, the display controller 121 controls such that each of the selection option cards 10 indicated in the received card information is displayed on the first display device 130 at the predetermined initial display size.

Figure 20:
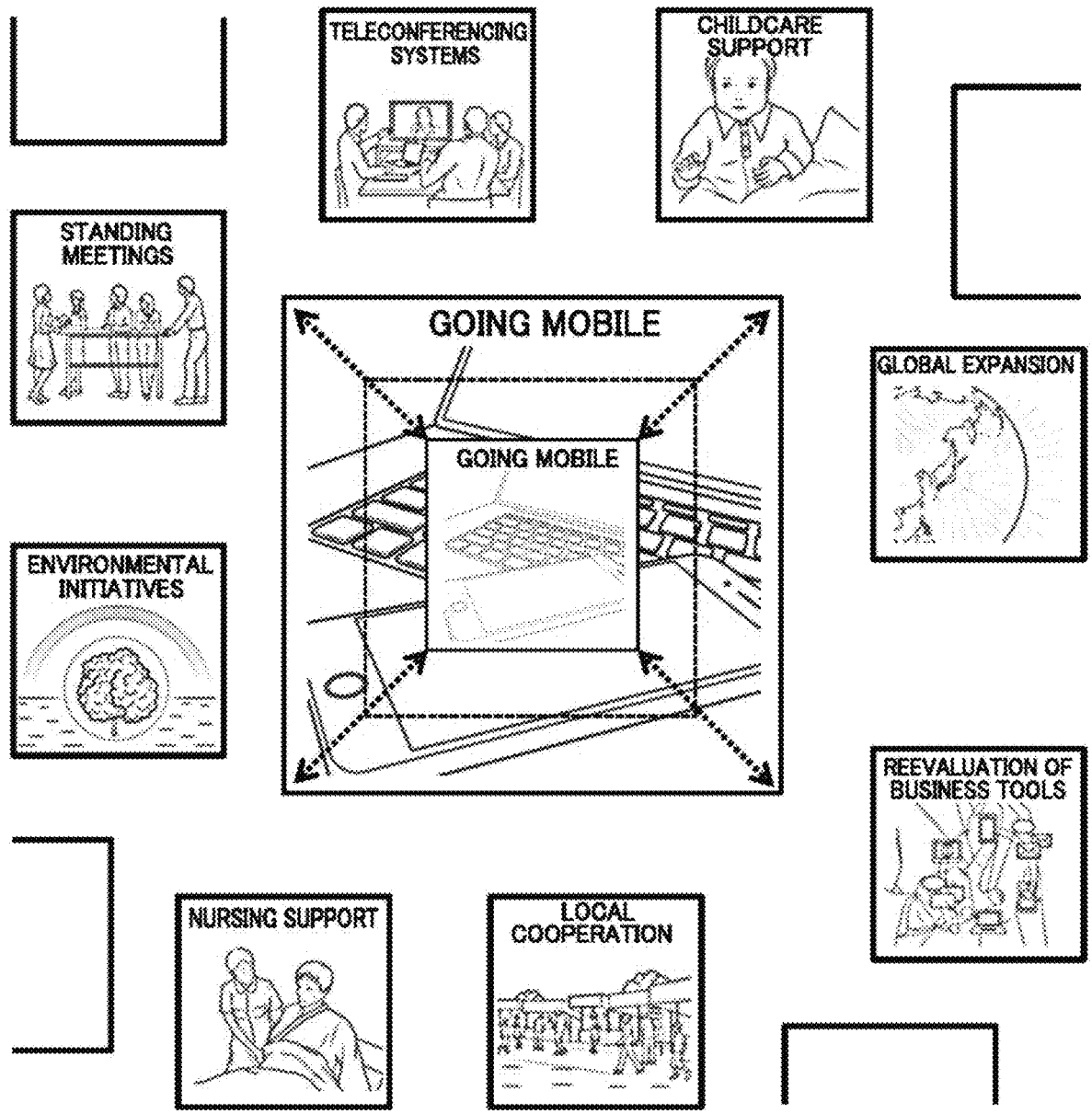
FIG. 20 is a diagram for explaining modification control for a display state.
Figure 21:
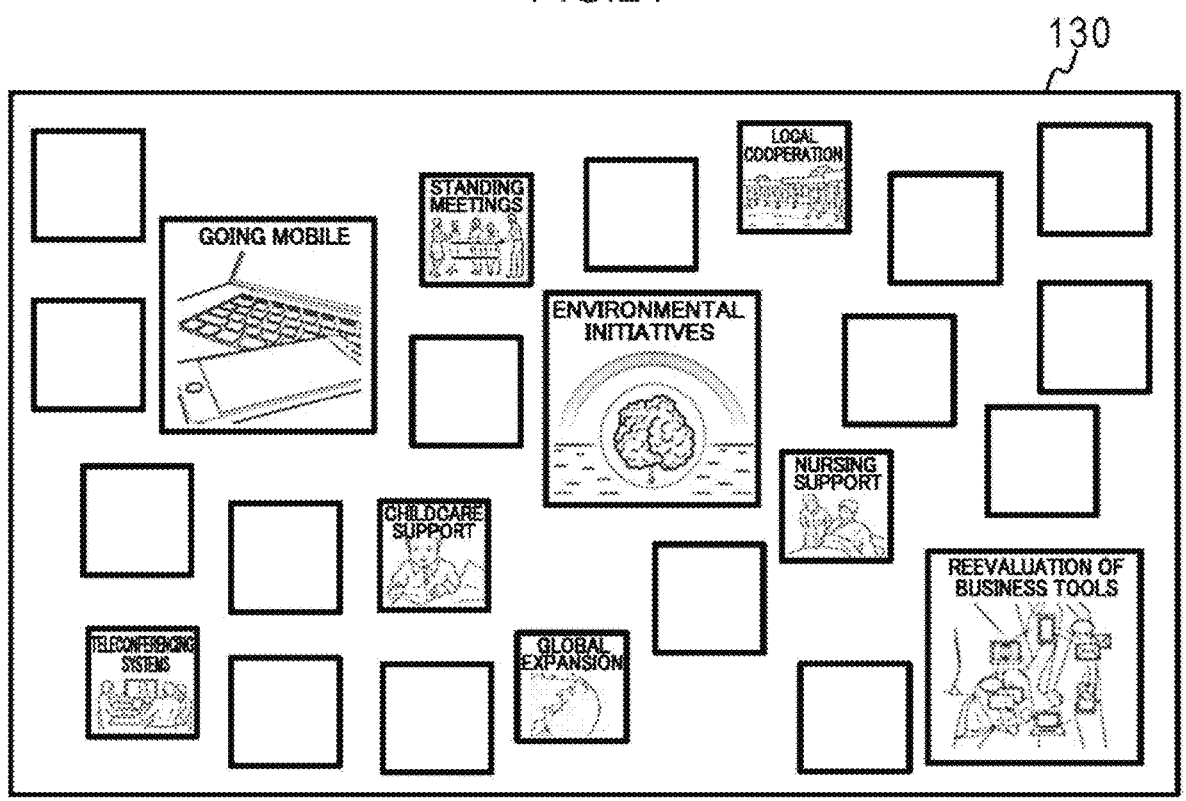
FIG. 21 is a diagram for explaining modification control for a display state.

Next, at step S32, the display controller 121 starts modification control of the display state of each selection option card 10 based on the received control information. FIG. 20 illustrates an example of a portion of a display region of the first display device 130 in which the selection option cards 10 are displayed and modification control for the display size has started. As illustrated in FIG. 20, the display controller 121 repeatedly executes expanding and shrinking of display size of the selection option cards 10 based on the control information such that the display size goes from the initial display size, to the maximum display size, and then returns to the initial display size, in this series. Moreover, when modifying the display size of each selection option card 10, the display controller 121 adjusts the position of each selection option card 10 such that the selection option cards 10 do not overlap with each other. Note that, as illustrated in FIG. 21, variation can be produced in the display size of each selection option card 10 at each moment by defining a different value for the period or start timing for each selection option card 10 in the control information of each selection option card 10. This facilitates drawing of attention of the users 105 to the various selection option cards 10.

Figure 22:
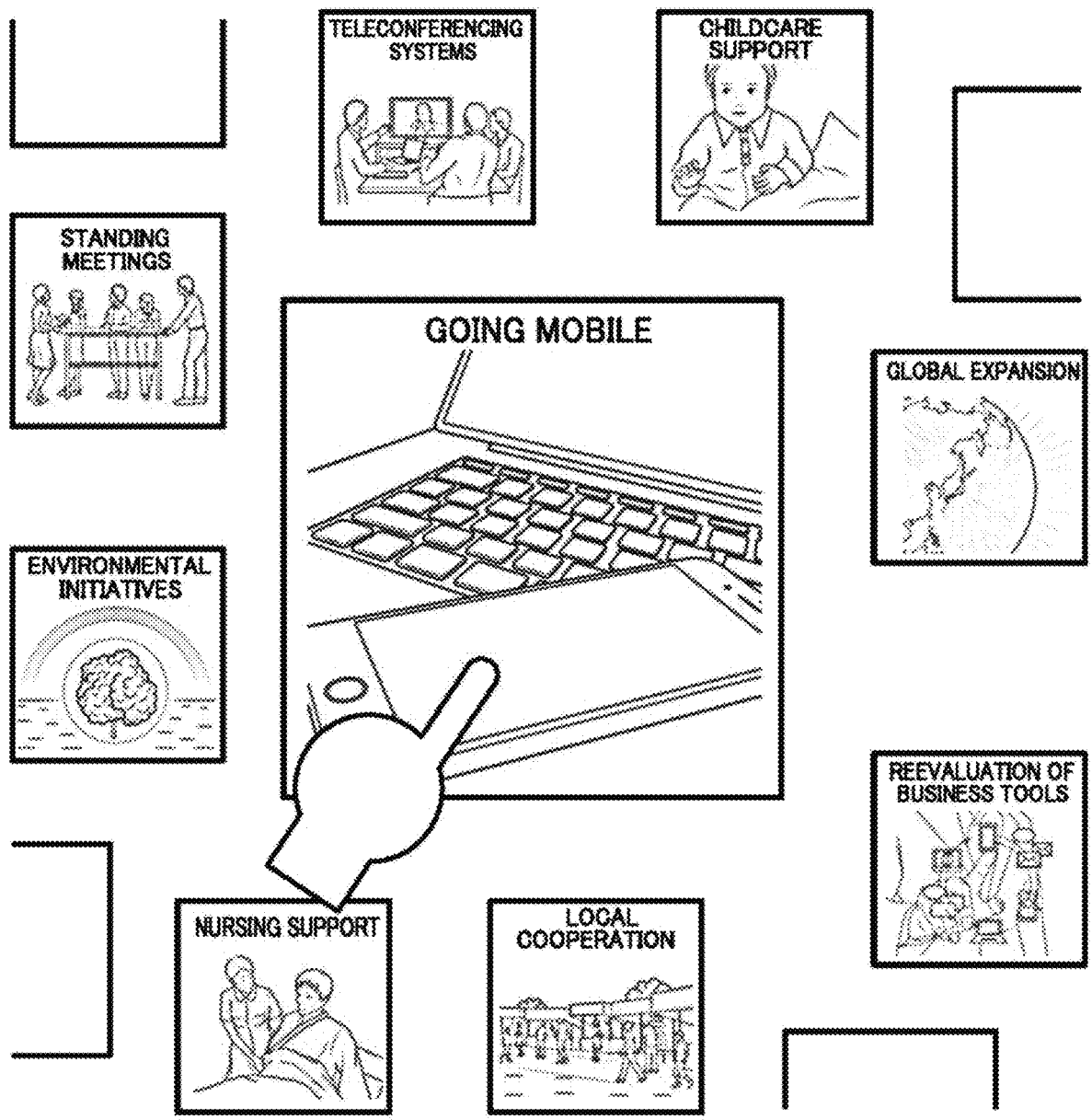
FIG. 22 is a diagram for explaining selection of a selection option card.

Next, at step S33, the detector 122 determines whether or not a selection option card 10 displayed on the first display device 130 has been touched by a user 105. FIG. 22 illustrates an example of a portion of the display region of the first display device 130 in which the selection option cards 10 are displayed. As illustrated in FIG. 22, processing transitions to step S34 when touching of any of the selection option cards 10 by a user 105 has been detected.

At step S34, the detector 122 determines whether or not the touching of the selection option card 10 is ongoing. When touching is ongoing, processing transitions to step S35; when touching is not ongoing, processing transitions to step S37.

At step S35, the detector 122 determines whether or not the specific duration (for example 3 seconds) for the touch continuation duration of the selection option card 10 has elapsed. In cases in which the specific duration of the touch continuation duration has not elapsed, processing returns to step S34; in cases in which the specific duration of the touch continuation duration has elapsed, processing transitions to step S36.

At step S36, the detector 122 forwards the card information of the touched selection option card 10 to the second control device 140.

Next, at step S37, the display controller 121 determines whether or not an instruction to end the service provided by the image control system 100 has been given, and processing returns to step S33 in cases in which an instruction to end the service has not been given.

At step S33, processing transitions to step S38 in cases in which the detector 122 has not detected touching of a selection option card 10. At step S38, the display controller 121 determines whether or not a stop instruction or a resume instruction for the modification control of the display state has been received from the management server 110. Processing transitions to step S39 when either a stop instruction or a resume instruction has been received, or processing returns to step S33 when neither has been received.

At step S39, the display controller 121 stops or resumes the modification control of the display state in accordance with the received instruction. Processing then returns to step S33.

Next, explanation follows regarding the second control processing illustrated in FIG. 23. The second control processing initiates when the background information transmitted by the management server 110 has been received by the second control device 140.

At step S41, the display controller 141 displays the background 12 indicated by the received background information on the second display device 150. The displayed background 12 may be modifiable by instruction by a user 105. For example, in cases in which an instruction to modify the background 12 has been given, the second control device 140 requests the background information from the management server 110. The management server 110 then transmits background information that differs from the background information previously transmitted from the background DB 117 to the second control device 140.

Next, at step S42, the display controller 141 determines whether or not card information has been received from the first control device 120. Processing transitions to step S43 in cases in which card information has been received. Here, the card information received is the card information of the selection option card 10 that, in the first control processing described above, was selected in the first display device 130, and which was forwarded by the first control device 120. At step S43, the display controller 141 displays the selection option card 10 indicated by the received card information on the background 12, and processing transitions to step S44. However, in cases in which card information has not been received, the processing of step S43 is skipped, and processing transitions to step S44.

At step S44, the reception section 142 determines whether or not an operation by the user 105, such as modification of the display position or modification of the display size of the selection option card 10 displayed on the second display device 150, input of text data, or drawing using the handwriting tool, has been received. Processing transitions to step S45 in cases in which an operation has been received. At step S45, the reception section 142 notifies the display controller 141 with the received information indicating the contents of the received operation of the user 105. Then, the display controller 141 modifies the display position and display size of the selection option card 10, displays the input text data, displays the drawn image, or the like based on the received information; and processing transitions to step S46. However, in cases in which an operation of the user 105 has not been received, the processing of step S45 is skipped, and processing transitions to step S46.

At step S46, the generation section 143 determines whether or not an instruction to finalize the vision has been given by a user 105. Processing transitions to step S47 in cases in which an instruction to finalize the vision has been given. At step S47, the generation section 143 acquires the display position of each of the selection option cards 10 on the background 12 displayed on the second display device 150. The generation section 143 then generates vision information including the background ID of the background 12 displayed on the second display device 150, the card IDs of the selection option cards 10, the established display position of each of the selection option cards 10, the input text data, and the drawn handwritten data. Moreover, the generation section 143 acquires the user group ID of the user group that generated the vision from the login information, the registration information employed when the system was used, or the like. The acquired user group ID is then appended to the generated vision information, the generated vision is transmitted to the management server 110, and processing then transitions to step S48. However, in cases in which finalization of the vision has not been instructed, the processing of step S47 is skipped and processing transitions to step S48.

At step S48, the reception section 142 determines whether or not an instruction to end the service provided by the image control system 100 has been given. Processing returns to step S42 in cases in which an instruction to end the service has not been given; otherwise, the second control processing ends in cases in which an instruction to end the service has been given.

Figure 24:
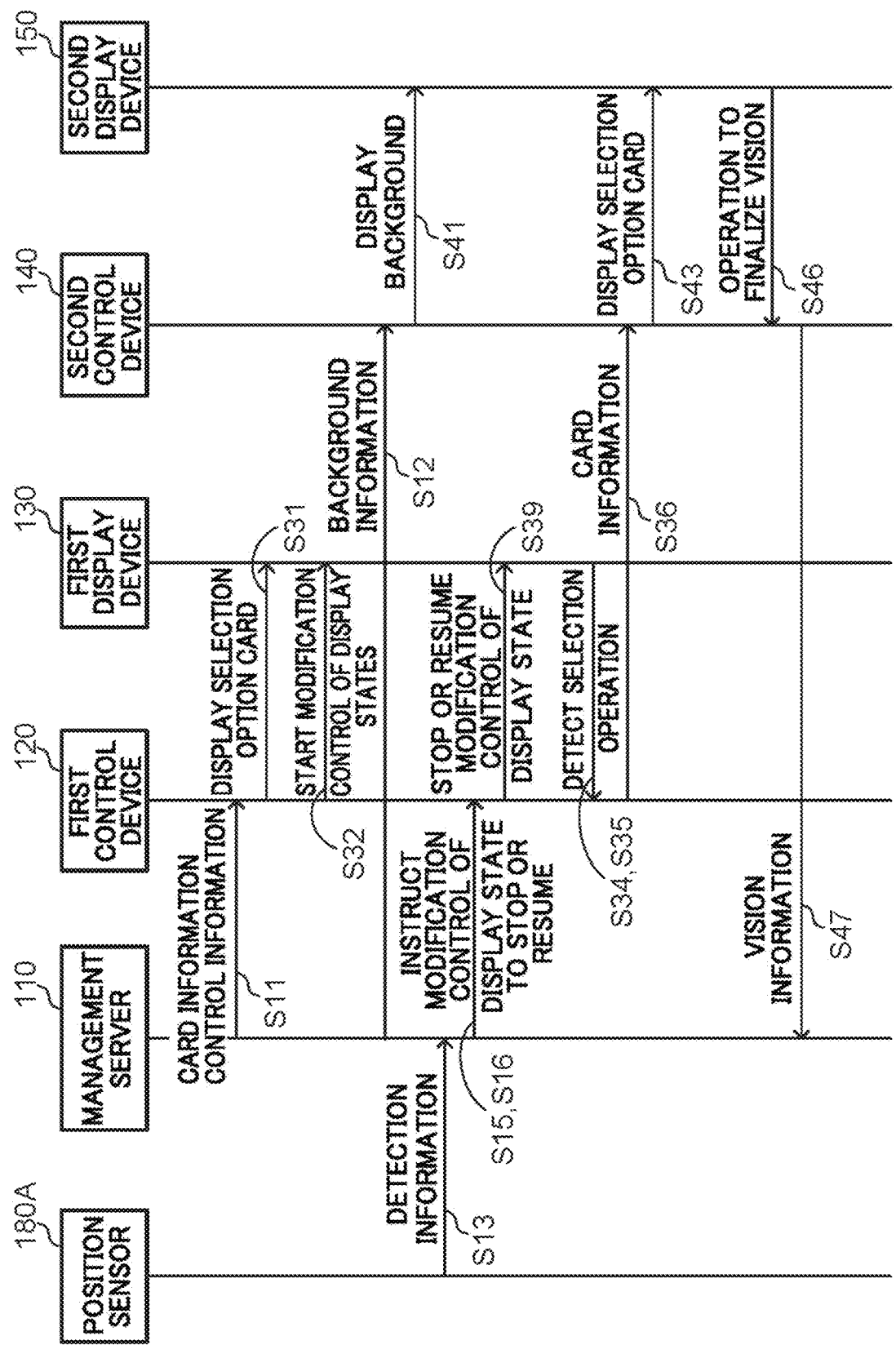
FIG. 24 is a sequence diagram illustrating exchange of information between respective devices.

Next, explanation follows regarding the exchange of information between each of the devices, with reference to the sequence diagram in FIG. 24. Note that in the explanation of the respective processing included in the sequence diagram in FIG. 24, processing that is the same as the processing explained in FIG. 17, FIG. 18, FIG. 19, and FIG. 23 is allocated the same reference numerals as those used in FIG. 17, FIG. 18, FIG. 19, and FIG. 23.

First, when an instruction has been given to initiate the service provided by the image control system 100, the management server 110 transmits the card information of the selection option cards 10 and the control information to the first control device 120 (S11). Then, the first control device 120 displays the selection option cards 10 on the first display device 130 based on the card information (S31). The first control device 120 also starts modification control of the display state of the selection option card 10 based on the control information (S32). The management server 110 also transmits the background information to the second control device 140 (S12). The second control device 140 then displays the background 12 on the second display device 150 based on the background information (S41).

The management server 110 acquires the detection information from the position sensors 180A (S13) and determines whether or not the position of a user 105 is within the predetermined range 191 based on the position of the user 105 indicated by the acquired detection information. Then, in cases in which the position of a user 105 is within the predetermined range 191, the management server 110 transmits a stop instruction for the modification control of the display state to the first control device 120 (S15). In cases in which no user 105 is present within the predetermined range 191, the management server 110 transmits a resume instruction for the modification control of the display state to the first control device 120 (S16).

The first control device 120 stops the modification control of the display state in cases in which a stop instruction for the modification control of the display state has been received, and the first control device 120 resumes the modification control of the display state in cases in which a resume instruction for the modification control of the display state has been received (S39).

The first control device 120 detects a selection operation of a selection option card 10 on the first display device 130 by a user 105 (S34, S35). When a selection operation has been detected, the first control device 120 forwards card information of the selected selection option card 10 to the second control device 140 (S36).

When the second control device 140 has received the card information, the second control device 140 displays the selection option card 10 on the second display device 150 based on the received card information (S43).

When a user 105 has given an instruction to finalize a vision on the second display device 150 (S46), the second control device 140 generates the vision information based on the background 12 and the selection option cards 10 displayed on the second display device 150, and transmits the generated vision information to the management server 110 (S47).

As explained above, the image control system 100 according to the first exemplary embodiment performs modification control of the display state such that the display states of the selection option cards displayed on the first display device are changed with the passage of time.

Accordingly, the probability of the user noticing the presence of a selection option card that a user had not noticed the presence of can be raised, and users can be given an impetus to inspect various selection option cards. Moreover, modification control of the display states of the selection option cards stops in cases in which a user is present in a range where selection operations on the selection option cards displayed on the first display device are possible. This can prevent selection work on the selection option cards by the user from being hindered.

Namely, the image control system 100 according to the first exemplary embodiment enables plural selection option cards to be displayed such that the presence of various selection options can be noticed by the user without hindering selection work by the user.

Second Exemplary Embodiment

Next, explanation follows regarding a second exemplary embodiment. In the first exemplary embodiment, explanation was given regarding a case in which whether or not to stop the modification control of the display state of the selection option cards was determined based on the position of a user. In the second exemplary embodiment, explanation is given regarding a case in which whether or not to stop the modification control of the display state of the selection option cards is determined based on the gaze region of a user. Note that in an image control system according to the second exemplary embodiment, portions that are the same as those of the image control system 100 according to the first exemplary embodiment are allocated the same reference numeral and detailed explanation thereof is omitted.

Figure 25:
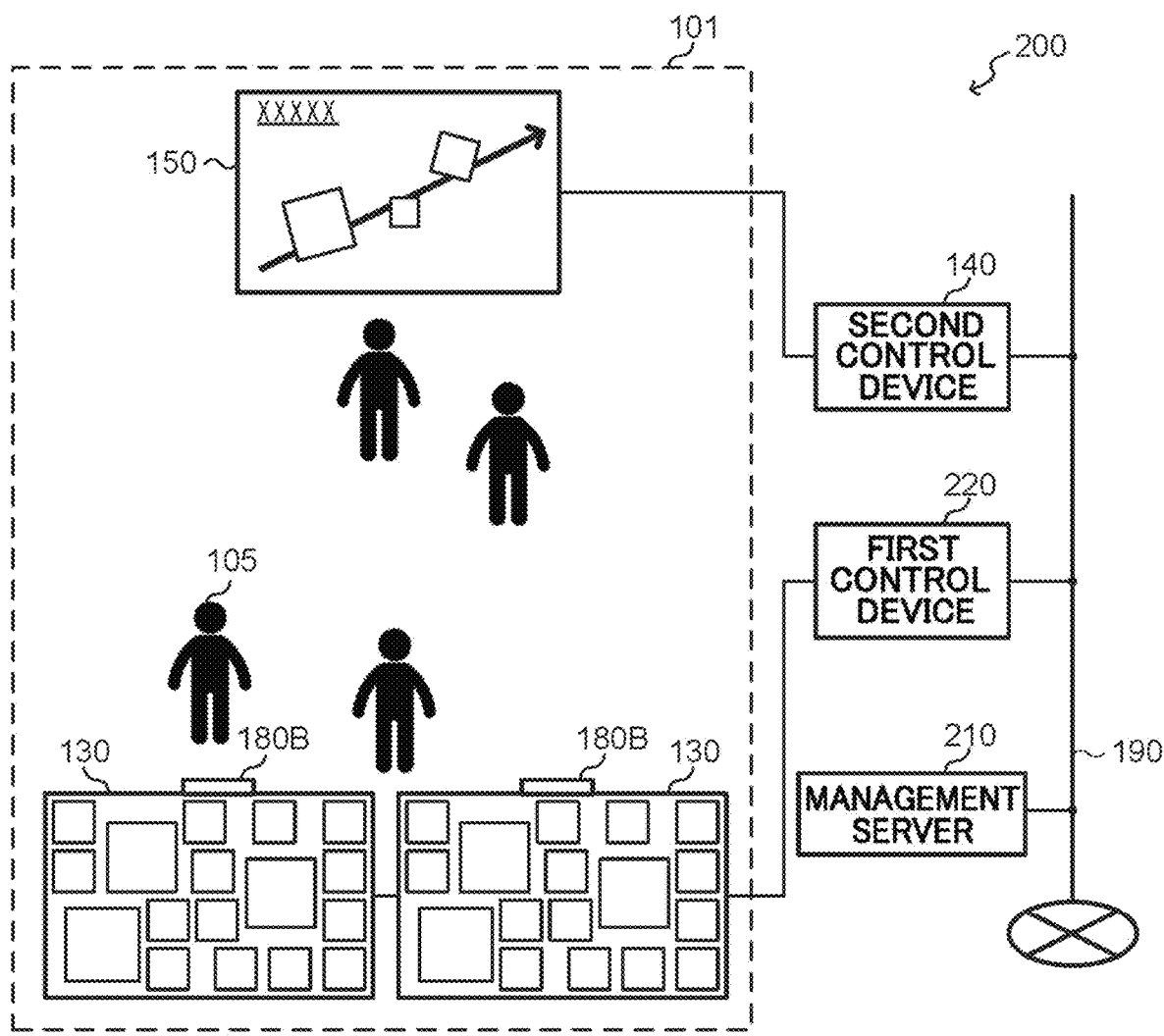
FIG. 25 is a block diagram illustrating a schematic configuration of an image control system according to the second exemplary embodiment.

As illustrated in FIG. 25, an image control system 200 according to the second exemplary embodiment includes a management server 210, a first control device 220, the first display devices 130, the second control device 140, the second display device 150, and a gaze region sensor 180B.

For example, a gaze region sensor provided with an infrared camera, an infrared light source, and control software may be employed as the gaze region sensor 180B. The gaze region sensor 180B computes a gaze direction based on the position of the pupil or cornea reflection detected from an image captured by an infrared camera for a range of illumination by the infrared light source, and outputs detection information indicating the computed gaze direction. The gaze region sensor 180B is installed at position where a gaze of the user 105 toward the first display device 130 direction can be detected by an infrared camera included in the gaze region sensor 180B, for example, above or below the first display device 130. Note that the gaze region sensor 180B is not limited to the above method; a method employing a visible light camera or the like or another type of gaze region sensor method may be employed.

As illustrated in FIG. 6, the management server 210 includes a management section 211, an acquisition section 212, and a determination section 213 as functional sections. Moreover, a card DB 115, a control information DB 116, a background DB 117, and a vision DB 118 are stored in a specific storage region of the management server 210.

The acquisition section 212 acquires detection information output from the gaze region sensor 180B and passes the acquired detection information to the determination section 213.

Figure 26:
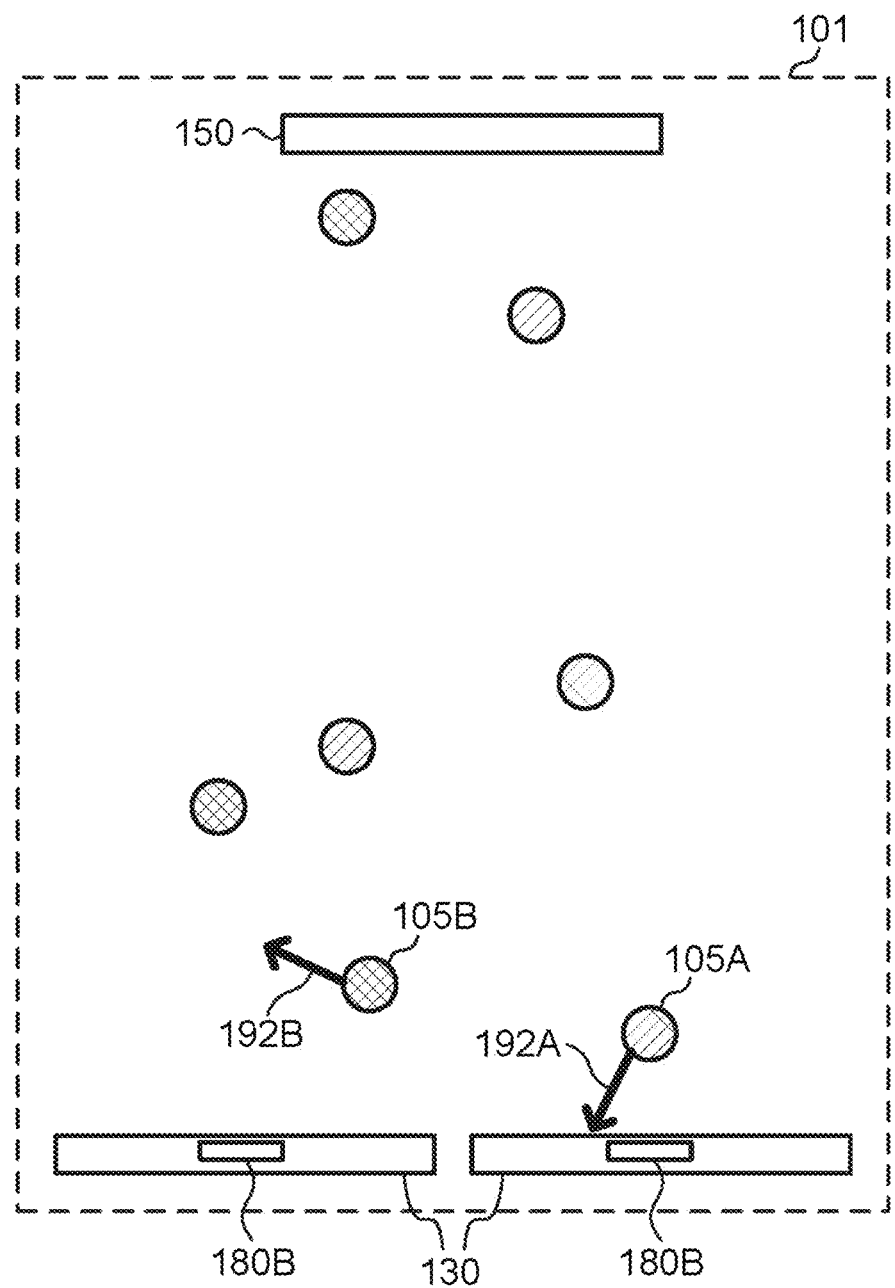
FIG. 26 is a diagram for explaining a gaze direction toward a first display device.

The determination section 213 identifies a gaze position of each user 105 based on the detection information passed from the acquisition section 212, and determines whether or not the gaze region of any of the users 105 is in a resting state on the first display device 130. More specifically, the determination section 213 extracts gaze directions toward the first display device 130 direction from out of gaze directions indicated by the detection information based on the gaze directions indicated by the detection information passed from the acquisition section 212, and based on a placement relationship between the gaze region sensor 180B and the first display device 130. For example, as illustrated in FIG. 26, a gaze direction 192A of a user 105A is a gaze direction toward the first display device 130 direction and is therefore extracted, and a gaze direction 192B of a user 105B is not a gaze direction toward the first display device 130 direction and is therefore not extracted. The determination section 213 then identifies the gaze position on the first display device 130 indicated by the extracted gaze direction. Moreover, in cases in which the gaze position lies in a resting region that has a specific size on the first display device 130 for a specific amount of time (for example, three seconds), the determination section 213 determines that the gaze region of the user 105 is in a resting state on the first display device 130.

When the determination section 213 has determined that the gaze region of the user 105 is in a resting state on the first display device 130, the determination section 213 identifies center coordinates of the resting region on the first display device 130, and notifies the management section 211 that the gaze region of the user 105 is in a resting state together with the center coordinates of the resting region. However, when the determination section 213 has determined that the gaze region of the user 105 is not in a resting state on the first display device 130, the determination section 213 notifies the management section 211 that the gaze region of the user 105 is not in a resting state.

Similarly to the management section 111 of the first exemplary embodiment, the management section 211 stores and reads information to and from various databases and manages exchange of information with the first control device 220 and the second control device 140.

Moreover, when the management section 211 has been notified, from the determination section 213, that the gaze region of the user 105 is in the resting state together with the center coordinates of the resting region, the management section 211 estimates a field of view when the user 105 is viewing the resting region based on the center coordinates of the resting region. The management section 211 then transmits, to the first control device 220, a stop instruction for modification control of the display state of the selection option cards 10 included in the estimated field of view.

Figure 27:
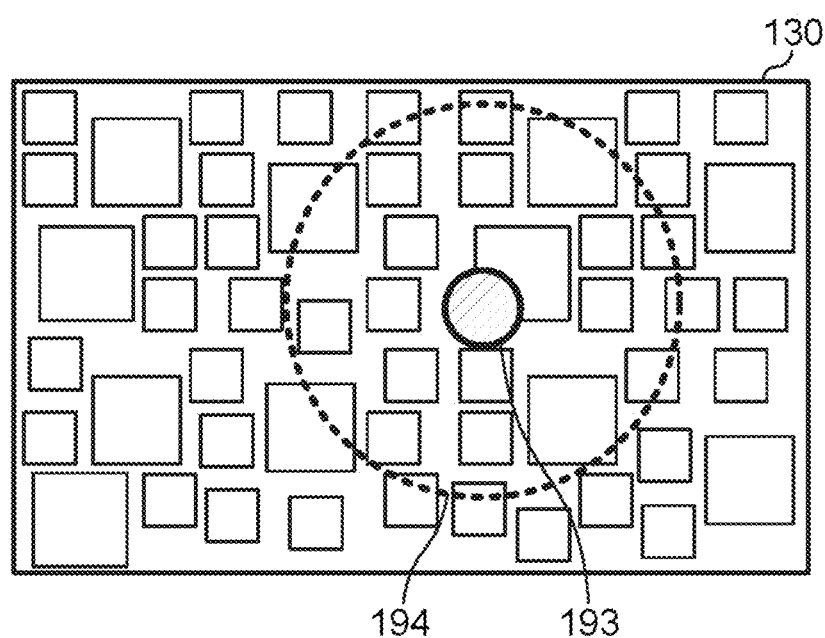
FIG. 27 is a diagram for explaining a resting region of a gaze region and a field of view.

For example, suppose the gaze position identified based on the detection information for a recent specific amount of time that includes the current moment lies in a resting region 193 on the first display device 130 as illustrated in FIG. 27. In such cases, the management section 211 estimates a field of view 194 as a range of a specific radius about the center coordinates of the resting region 193 since the center coordinates are notified from the determination section 213. The determination section 213 then references the "display position" item of the card DB 115 and identifies the selection option cards 10 included the field of view 194. The determination section 213 transmits, to the first control device 220, the card IDs of the identified selection option cards 10 and a stop instruction for the modification control of the display states of the selection option cards 10 indicated by those card IDs.

Moreover, when the management section 211 has been notified from the determination section 213 that the gaze region of the user 105 is not in a resting state, the management section 211 transmits a resume instruction for the modification control of the display states to the first control device 220.

Next, explanation follows regarding the first control device 220. As illustrated in FIG. 12, the first control device 220 includes a display controller 221 and the detector 122 as functional sections.

Similarly to the display controller 121 of the first exemplary embodiment, the display controller 221 displays the selection option cards 10 based on the card information transmitted from the management server 210 and performs modification control of the display states based on the control information.

Moreover, when the display controller 221 has received the stop instruction for the modification control of the display states together with the card IDs from the management server 210, the display controller 221 stops the modification control of the display states for the selection option cards 10 indicated by the received card IDs.

Accordingly, the modification control of the display state is stopped for the selection option cards 10 displayed in the region on the first display device 130 estimated as the field of view 194 of the user 105. Accordingly, modification of the display states of the selection option cards 10 and hindering of selection work on the selection option cards 10 by the user 105 can be prevented when it is estimated that the user 105 is viewing the first display device 130. However, display to facilitate drawing of attention of other users 105 to the selection option cards 10 can continue since the modification control of the display states is not stopped for the selection option cards 10 displayed in regions other than the field of view 194. Namely, a display state can be implemented that combines region of a public mode not being viewed by any users 105 where display is performed to facilitate drawing of attention to the selection option cards 10 and a region of a personal mode where the user 105, who is viewing, is present and where display is performed to facilitate continued viewing of the selection option cards 10 on the same first display device 130.

Moreover, when the display controller 221 has received a resume instruction for the modification control of the display state from the management server 210, the display controller 221 resumes modification control of the display state for the selection option cards 10 for which the modification control of the display states was stopped. Accordingly, the entire first display device 130 becomes the region of the public mode.

The management server 210 may, for example, be implemented by the computer 20 illustrated in FIG. 14. A management program 30A for causing the computer 20 to function as the management server 210 is stored in the storage section 23 of the computer 20. The management program 30A includes a management process 31A, an acquisition process 32A, and a determination process 33A.

The CPU 21 reads the management program 30A from the storage section 23, expands the management program 30A into the memory 22, and sequentially executes the processes included in the management program 30A. The CPU 21 operates as the management section 211 illustrated in FIG. 6 by executing the management process 31A. The CPU 21 also operates as the acquisition section 212 illustrated in FIG. 6 by executing the acquisition process 32A. The CPU 21 also operates as the determination section 213 illustrated in FIG. 6 by executing the determination process 33A. The CPU 21 respectively reads the items of information from the information storage regions 34, and respectively expands each database into the memory 22. The computer 20, which executes the management program 30A, thereby functions as the management server 210.

The first control device 220 may, for example, be implemented by the computer 40 illustrated in FIG. 15. A first control program 50A for causing the computer 40 to function as the first control device 220 is stored in the storage section 43 of the computer 40. The first control program 50A includes a display control process 51A and a detection process 52.

The CPU 41 reads the first control program 50A from the storage section 43, expands the first control program 50A into the memory 42, and sequentially executes the processes included in the first control program 50A. The CPU 41 operates as the display controller 221 illustrated in FIG. 12 by executing the display control process 51A. The detection process 52 is the same as that of the first exemplary embodiment. The computer 40, which executes the first control program 50A, thereby functions as the first control device 220.

Similarly to in the first exemplary embodiment, the second control device 140 may, for example, be implemented by the computer 60 illustrated in FIG. 16.

Note that the functionality implemented by the management program 30A and the first control program 50A may, for example, be implemented by a semiconductor integrated circuit, and more specifically, by an ASIC or the like.

Next, explanation follows regarding operation of the image control system 200 according to the second exemplary embodiment. In the second exemplary embodiment, the first management processing executed by the management server 210 and the first control processing executed by the first control device 220 are different from the operation according to the first exemplary embodiment. Explanation follows regarding the first management processing and the first control processing in the second exemplary embodiment. Note that for the first management processing and the first control processing of the second exemplary embodiment, processing similar to that of the respective first management processing and first control processing of the first exemplary embodiment is allocated the same reference numeral and detailed explanation thereof is omitted.

Figure 28:
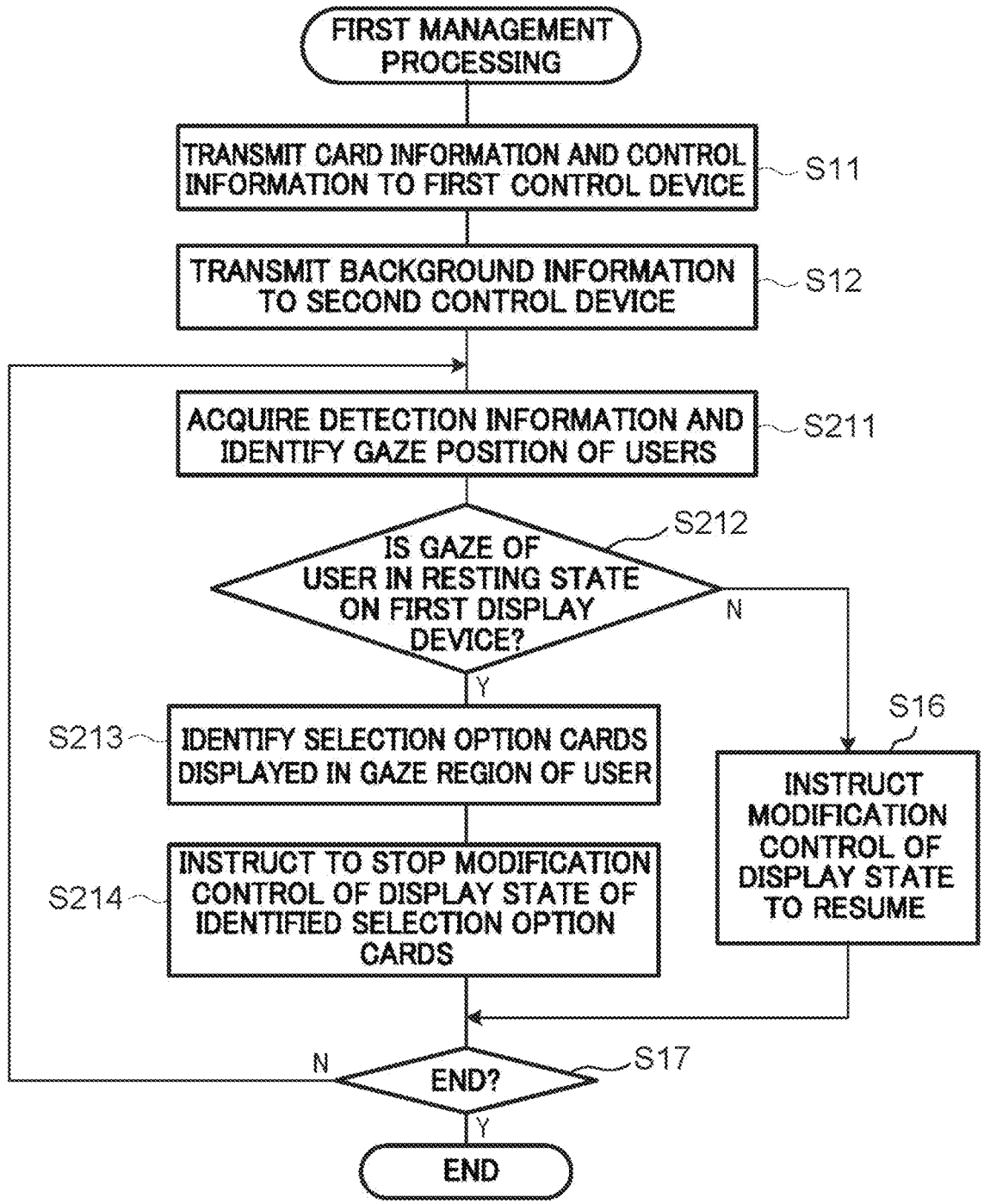
FIG. 28 is a flowchart illustrating an example of first management processing of the second exemplary embodiment.

After steps S11 and S12 of the first management processing of the second exemplary embodiment illustrated in FIG. 28, at the next step S211, the acquisition section 212 acquires the detection information output from the gaze region sensor 180B and passes the acquired detection information to the determination section 213. The determination section 213 then identifies the gaze position of each user 105 based on the detection information passed from the acquisition section 212.

Next, at step S212, the determination section 213 determines whether or not the gaze region of a user 105 is in a resting state on the first display device 130 based on whether or not the gaze position identified from the detection information for a recent specific amount of time that includes the current moment lies in a resting region 193 having a specific size. Processing transitions to step S213 in cases in which the gaze region of the user 105 is in the resting state, or processing transitions to step S16 in cases in which the gaze region of the user 105 is not in the resting state.

At step S213, the determination section 213 identifies the center coordinates of the resting region on the first display device 130 and notifies the management section 211 that the gaze region of the user 105 is in the resting state together with the center coordinates of the resting region 193. The management section 211 then estimates the field of view 194 when the user 105 is viewing the resting region 193 based on the center coordinates of the resting region 193. The management section 211 then references the "display position" item of the card DB 115 and identifies the selection option cards 10 included in the field of view 194.

Next, at step S214, the management section 211 transmits, to the first control device 220, the card IDs of the identified selection option cards 10 and a stop instruction for the modification control of the display states of the selection option cards 10 indicated by the card IDs, and processing transitions to step S17.

Next, explanation follows regarding the first control processing of the second exemplary embodiment. In the first control processing of the second exemplary embodiment, processing similar to that first control processing of the first exemplary embodiment illustrated in FIG. 19 is executed. However, at step S38, the display controller 221 receives the stop instruction for the modification control of the display states together with the card IDs from the management server 210. In such cases, at the next step S39, the display controller 221 stops the modification control of the display states for the selection option cards 10 indicated by the received card IDs. Namely, modification control of the display states continues for the selection option cards 10 having card IDs that were not received.

As explained above, the image control system 200 according to the second exemplary embodiment determines whether or not to stop the modification control of the display states of selection option cards based on whether or not the gaze region of the user is in the resting state. Similarly to in the first exemplary embodiment, this enables plural selection options to be displayed such that a user can notice the presence of various selection options without hindering selection work by the user.

Note that, similarly to the first exemplary embodiment, in the second exemplary embodiment also, configuration may be made such that determination of whether or not to stop the modification control of the display states of the selection option cards is made based on the position of the user 105. In such cases, configuration may be made so as to stop modification control of the display state of the selection option cards 10 displayed in a region of the first display device 130 corresponding to the position of the user 105 identified based on the detection information, for example, a region envisaged to be a range that is reachable by hand from the position of the identified user 105.

Moreover, in the second exemplary embodiment also, configuration may be made such that, similarly to in the first exemplary embodiment, the modification control of the display state is stopped for all of the selection option cards 10 in cases in which it is determined that the gaze region of the user 105 is in the resting state on the first display device 130.

Third Exemplary Embodiment

Next, explanation follows regarding a third exemplary embodiment. In the first and second exemplary embodiments, explanation was given regarding cases in which modification control of the display states of the selection option cards is stopped based on the position or gaze region of a user. In the third exemplary embodiment, explanation is given regarding a case in which the extent of modification control of the display states of the selection option cards differs based on the position of the user. Note that in an image control system according to the third exemplary embodiment, portions that are the same as those of the image control system 100 according to the first exemplary embodiment or the image control system 200 according to the second exemplary embodiment are allocated the same reference numeral and detailed explanation thereof is omitted.

As illustrated in FIG. 1, an image control system 300 according to the third exemplary embodiment includes a management server 310, a first control device 320, the first display devices 130, the second control device 140, the second display device 150, and the position sensor 180A.

As illustrated in FIG. 6, the management server 310 includes a management section 311, the acquisition section 112, and a determination section 313 as functional sections. Moreover, the card DB 115, the control information DB 116, the background DB 117, and the vision DB 118 are stored in a specific storage region of the management server 310.

Figure 29:
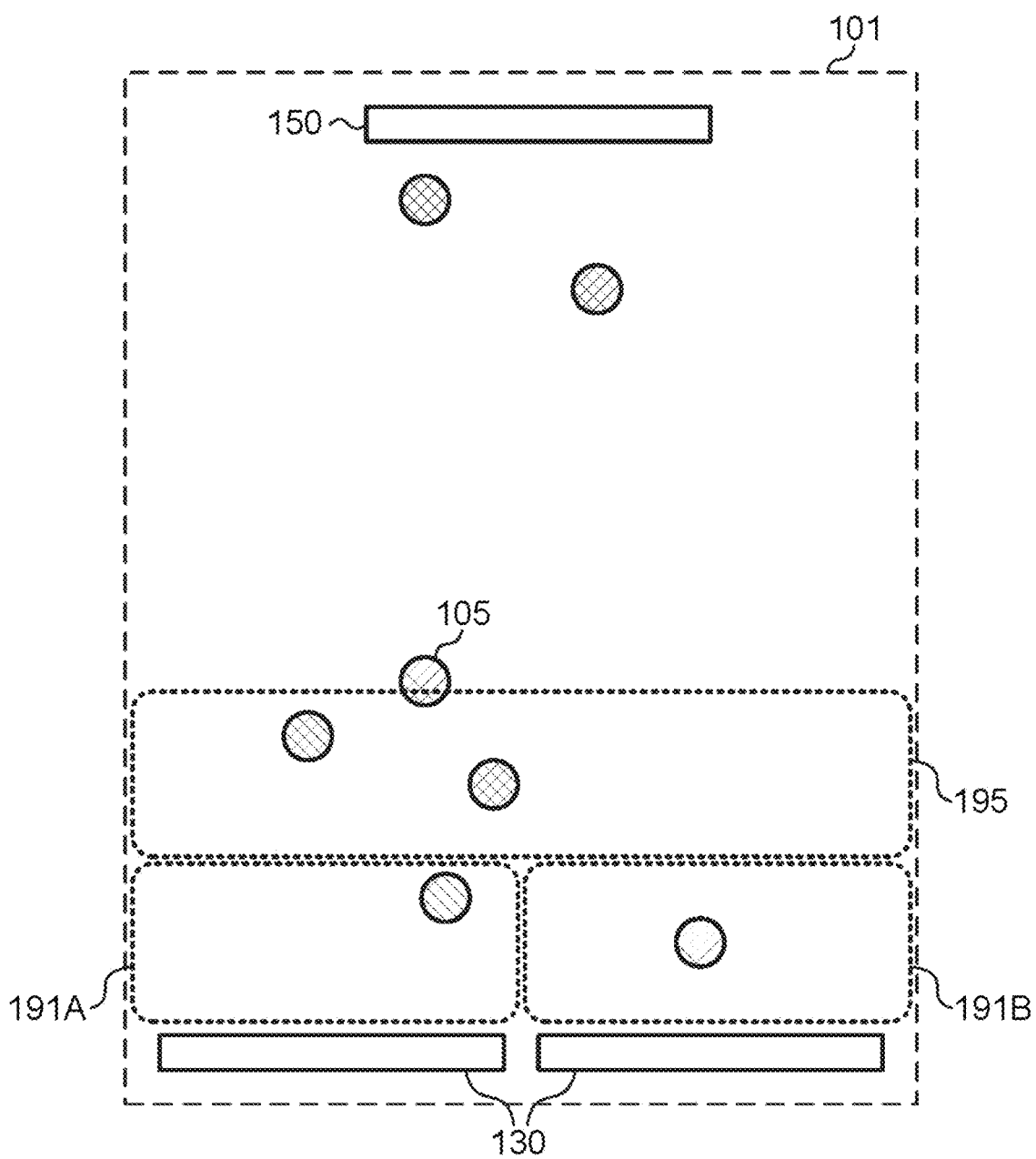
FIG. 29 is a diagram for explaining plural predetermined ranges of the third exemplary embodiment.

The determination section 313 identifies the position of each user 105 based on the detection information passed from the acquisition section 112 and determines whether or not the position of any of the users 105 is within any range out of plural predetermined ranges of the room 101. For example, as illustrated in FIG. 29, first ranges 191 close to the first display devices 130 and a second range 195 that is close to the first ranges 191 at the opposite side to the first display device 130 may be set as the plural predetermined ranges. The first ranges 191 are ranges set similarly to the predetermined range 191 of the first exemplary embodiment. The example of FIG. 29 illustrates an example in which a first range 191A and a first range 191B are set to respectively correspond to the two first display devices 130 are set as the first ranges 191. Moreover, the second range 195 is a range from which the users 105 can see the selection option cards 10 displayed on the first display device 130, but are not expected to be capable of performing touch operations on the first display device 130.

When the position of any of the users 105 is within any range out of the first ranges 191A and 191B and the second range 195, the determination section 313 notifies the management section 311 with information identifying that range (for example, a range ID). However, when none of the positions of the users 105 are within any of the ranges out of the first ranges 191A and 191B and the second range 195, the determination section 313 notifies the management section 311 that the positions of the users 105 are outside of the ranges.

Similarly to the management section 111 of the first exemplary embodiment, the management section 311 stores and reads information to and from various databases and manages exchange of information with the first control device 320 and the second control device 140.

Moreover, in cases in which information that identifies either of the first ranges 191A and 191B was notified from the determination section 313, the management section 311 identifies the corresponding first range 191A or first range 191B based on the information. The management section 311 references the "display position" item of the card DB 115 and identifies the card IDs of the selection option cards 10 displayed on the first display device 130 that corresponds to the identified first range 191A or 191B. The management section 311 then acquires the control information corresponding to the identified card IDs from the control information DB 116 and generates control information that decreases the extent of modification control of the display states.

More specifically, the management section 311 sets a value for the control information stored in the control information DB 116 to an ordinary extent of modification control of the display state, and generates new control information having a modified value of the control information with respect to the value for the ordinary extent. For example, the management section 311 may generate new control information that decreases the extent of modification control by lengthening the period or setting the maximum display size to a smaller size. The management section 311 transmits the generated, new control information to the first control device 320.

Moreover, when information identifying the second range 195 has been notified from the determination section 313, the management section 311 acquires the control information of all of the selection option cards 10 displayed on the first display devices 130 from the control information DB 116. The management section 311 then generates new control information that increases the extent of modification control, with respect to the value for the ordinary extent of modification control of the display state, based on the acquired control information. For example, the management section 311 may generate new control information that increases the extent of modification control by shortening the period, setting the maximum display size to a larger size, or adding modification control of another display state such as color or brightness. The management section 311 transmits the generated, new control information to the first control device 320.

Moreover, when notified from the determination section 313 that the positions of the users 105 are outside the ranges, the management section 311 transmits, to the first control device 320, an instruction to return to the ordinary extent of modification control of the display state.

Next, explanation follows regarding the first control device 320. As illustrated in FIG. 12, the first control device 320 includes a display controller 321 and the detector 122 as functional sections.

Similarly to the display controller 121 of the first exemplary embodiment, the display controller 321 displays the selection option cards 10 based on the card information transmitted from the management server 310 and performs modification control of display states based on the control information.

Moreover, the display controller 321 receives the new control information from the management server 310 and modifies the extent of modification control of the display states of the selection option cards 10 displayed on the first display device 130 based on the received, new control information.

More specifically, when the position of a user 105 is in the first range 191A or 191B, control information for decreasing the extent of modification control is transmitted from the management server 310. The display controller 321 decreases the extent of modification control of the display states of the corresponding selection option cards 10 based on the control information. More specifically, the display controller 321 identifies the selection option cards 10 for which the extent of modification control is to be modified based on the card IDs included in the new control information. The display controller 321 then, for example, performs a modification based on the new control information for the identified selection option cards 10 so as to lengthen the period of the modification control of the display states in a series of expanding and shrinking the display size and to decrease the maximum display size. This can prevent selection work on the selection option cards 10 by the user 105 from being hindered since the extent of change of the display states of the selection option cards 10 displayed on the first display device 130 becomes gentler.

Moreover, when the position of the user 105 is within the second range 195, control information for increasing the extent of modification control is transmitted from the management server 310. Based on the control information, the display controller 321 increases the extent of modification control of the display states of all of the selection option cards 10 by processing similar to that executed when decreasing the extent of modification control. This enables the interest of the user 105 to be drawn to the selection option cards 10, and enables the user 105 to be encouraged to make selection work on the selection option cards 10, since changes to the display states of the selection option cards 10 displayed on the first display device 130 become more lively.

Note that when users 105 are present in both the first range 191A or 191B and the second range 195, the control to decrease the extent of modification control is executed so that priority is placed on not hindering selection work on the selection option cards 10 by the user 105.

Moreover, when the display controller 321 has received an instruction from the management server 310 to return to the ordinary extent of modification control of the display states, the modification control of the display states is restored for all of the selection option cards 10 based on the control information received with the initial card information.

The management server 310 may, for example, be implemented by the computer 20 illustrated in FIG. 14. A management program 30B for causing the computer 20 to function as the management server 310 is stored in the storage section 23 of the computer 20. The management program 30B includes a management process 31B, the acquisition process 32, and a determination process 33B.

The CPU 21 reads the management program 30B from the storage section 23, expands the management program 30B into the memory 22, and sequentially executes the processes included in the management program 30B. The CPU 21 operates as the management section 311 illustrated in FIG. 6 by executing the management process 31B. The CPU 21 also operates as the determination section 313 illustrated in FIG. 6 by executing the determination process 33B. The acquisition process 32 is the same as that of the first exemplary embodiment. The CPU 21 also reads the information from the information storage regions 35 and expands the various databases into the memory 22. The computer 20, which executes the management program 30B, thereby functions as the management server 310.

The first control device 320 may, for example, be implemented by the computer 40 illustrated in FIG. 15. A first control program 50B for causing the computer 40 to function as the first control device 320 is stored in the storage section 43 of the computer 40. The first control program 50B includes a display control process 51B and the detection process 52.

The CPU 41 reads the first control program 50B from the storage section 43, expands the first control program 50B into the memory 42, and sequentially executes the processes included in the first control program 50B. The CPU 41 operates as the display controller 321 illustrated in FIG. 12 by executing the display control process 51B. The detection process 52 is the same as that of the first exemplary embodiment. The computer 40, which executes the first control program 50B, thereby functions as the first control device 320.

Similarly to in the first exemplary embodiment, the second control device 140 may, for example, be implemented by the computer 60 illustrated in FIG. 16.

Note that the functionality implemented by the management program 30B and the first control program 50B may, for example, be implemented by a semiconductor integrated circuit, and more specifically, by an ASIC or the like.

Next, explanation follows regarding operation of the image control system 300 according to the third exemplary embodiment. In the third exemplary embodiment, the first management processing executed by the management server 310 and the first control processing executed by the first control device 320 have different operation from those of the first exemplary embodiment. Explanation follows regarding the first management processing and the first control processing of the third exemplary embodiment. Note that in the first management processing and the first control processing of the third exemplary embodiment, processing similar to that of the respective first management processing and first control processing of the first exemplary embodiment is allocated the same reference numeral and detailed explanation thereof is omitted.

Figure 30:
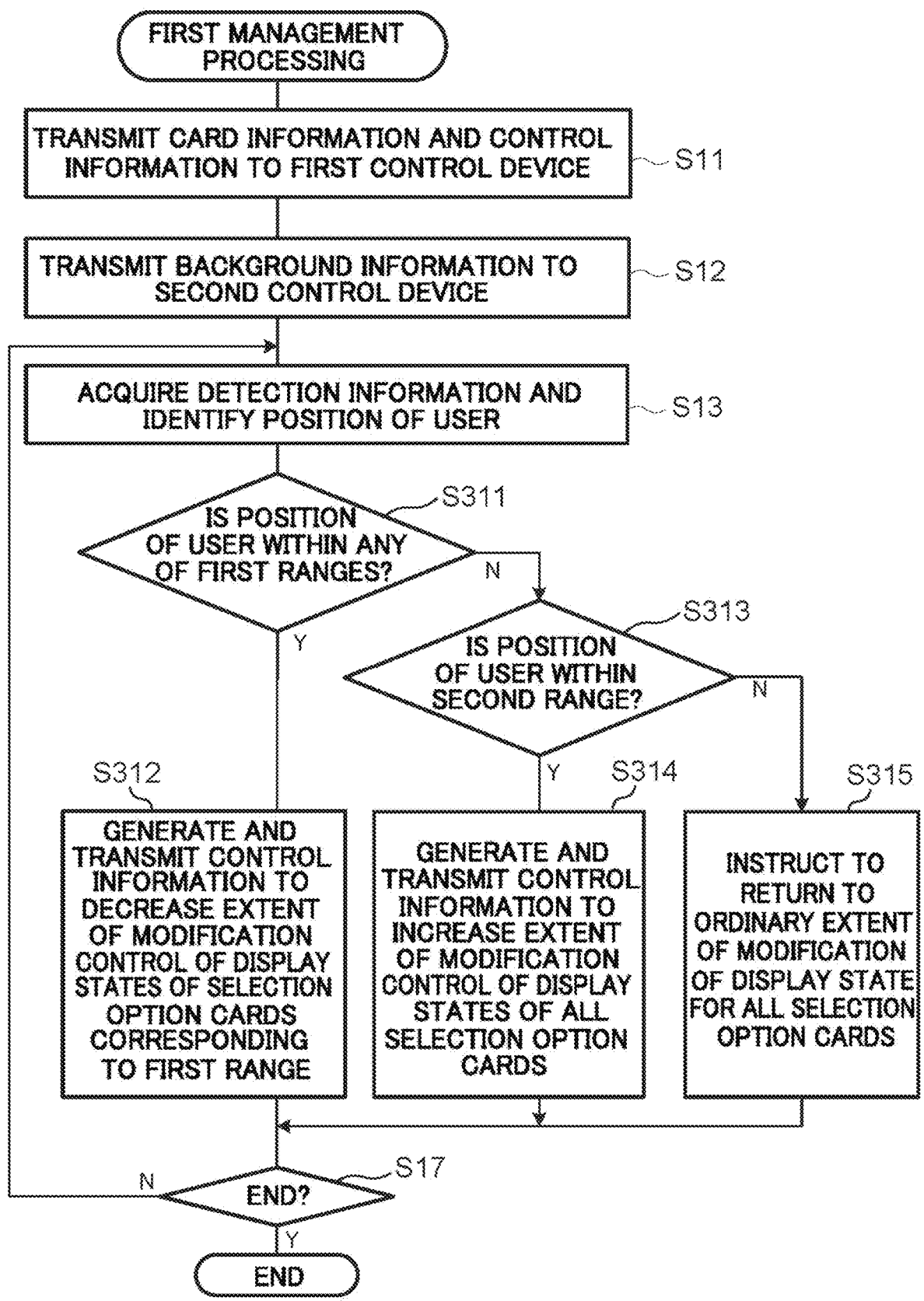
FIG. 30 is a flowchart illustrating an example of first management processing of the third exemplary embodiment.

After steps S11 to S13 of the first management processing of the third exemplary embodiment illustrated in FIG. 30, at the next step S311, the determination section 313 determines whether or not an identified position of a user 105 is within one of the first ranges 191A and 191B. Processing transitions to step S312 when the position of a user 105 is within one of the first ranges 191A and 191B, or processing transitions to step S313 when the positions of the users 105 are outside of the first ranges 191A and 191B.

At step S312, the determination section 313 notifies the management section 311 of information that identifies the first range 191A or 191B in which the user 105 is present. The management section 311 references the "display position" item of the card DB 115 and identifies the card IDs of the selection option cards 10 displayed on the first display device 130 that corresponds to the first range 191A or 191B in which the user 105 is present. The management section 311 then acquires the control information corresponding to the identified card IDs from the control information DB 116, generates control information to decrease the extent of modification control of the display states based on the acquired control information, and transmits the generated, new control information to the first control device 320.

However, at step S313, the determination section 313 determines whether or not an identified position of the users 105 is within the second range 195. Processing transitions to step S314 when a position of a user 105 is within the second range 195, or processing transitions to step S315 when the positions of the users 105 are outside of the second range 195.

At step S314, the determination section 313 notifies the management section 311 of the information that identifies the second range 195 in which the user 105 is present. The management section 311 acquires control information from the control information DB 116 for all of the selection option cards 10 displayed on the first display device 130. The management section 311 then generates control information to increase the extent of modification control of the display states based on the acquired control information and transmits the generated, new control information to the first control device 320.

However, at step S315, the management section 311 transmits, to the first control device 320, an instruction to return to the ordinary extent of modification control of the display state of all of the selection option cards 10 displayed on the first display device 130.

Figure 31:
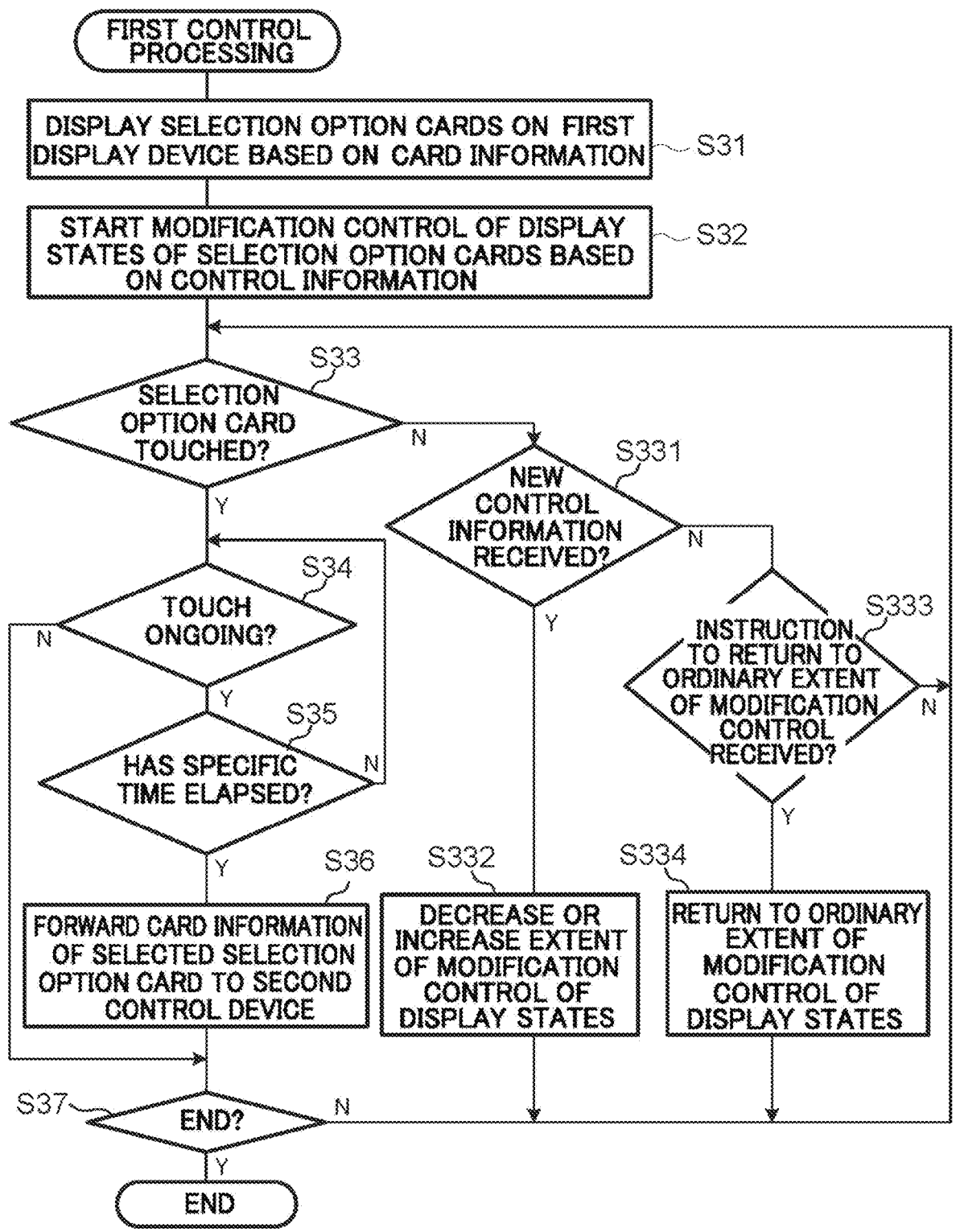
FIG. 31 is a flowchart illustrating an example of first control processing of the third exemplary embodiment.

Next, after steps S31 to S32 of the first control processing of the third exemplary embodiment illustrated in FIG. 31, processing transitions to step S331 if negative determination is made at the next step S33.

At step S331, the display controller 321 determines whether or not new control information has been received from the management server 310. Processing transitions to step S332 in cases in which new control information has been received, or processing transitions to step S333 in cases in which no new control information was received.

At step S332, the display controller 321 performs a modification to decrease or increase the extent of modification control of the display states of the corresponding selection option cards 10 displayed on the first display device 130 based on the received, new control information. Processing then returns to step S33.

However, at step S333, the display controller 321 determines whether or not an instruction to return to the ordinary extent of modification control of the display state has been received from the management server 310. Processing transitions to step S334 in cases in which an instruction to return to the ordinary extent has been received, or processing transitions to step S33 in cases in which no such instruction has been received.

At step S334, the display controller 321 returns to modification control of the display state based on the control information received together with the initial card information for all the selection option cards 10 displayed on the first display device 130, namely, the same modification control as at step S32 above. Processing then returns to step S33.

As explained above, the image control system 300 according to the third exemplary embodiment decreases and increases the extent of modification control of the display states of the selection option cards displayed on the first display device in accordance with the positions of users. Similarly to in the first exemplary embodiment, this enables plural selection options to be displayed such that users can notice the presence of various selection options, and enables users to be encouraged to perform selection work on selection options, without hindering selection work by users.

Note that in the third exemplary embodiment also, configuration may be made such that the gaze region of the user 105 is detected and determination is also made as to whether or not the gaze region is in a resting state, like in the second exemplary embodiment. For example, control may be performed such that the extent of modification control may be increased when the position of a user 105 is within the second range, and the extent of modification control may be decreased when the gaze region of a user 105 is in a resting state on the first display device 130.

Moreover, in each of the exemplary embodiments above, explanation has been given regarding a case in which expanding and shrinking the display size of the selection option card 10 with the passage of time serves as an example of modification control of the display state of the selection option card 10; however, there is no limitation thereto. Configuration may be made such that angle, color, brightness, contrast, and the like of the selection option card 10 are changed with the passage of time. In such cases, values for changing the angle, color, brightness, contrast, and the like may be defined in the control information. Moreover, the display positions of the selection option cards 10 may be changed with the passage of time so as to represent the selection option cards 10 like a flow of a river.

Figure 32:
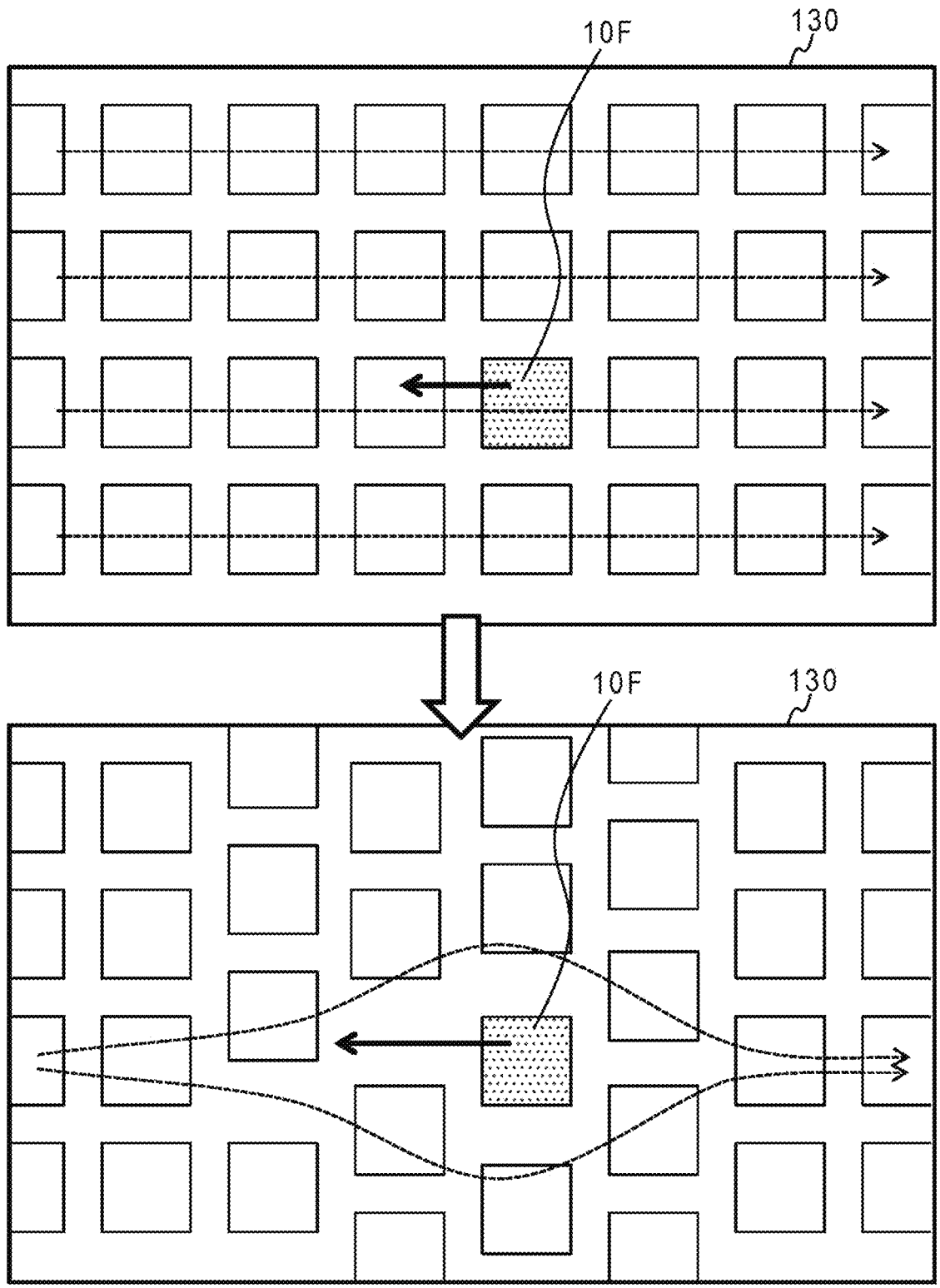
FIG. 32 is a diagram for explaining movement of selection option cards.

More specifically, as illustrated in the upper part of FIG. 32, the selection option cards may be displayed on the first display device with the plural selection option cards 10 moving in a rightward direction, a leftward direction, an upward direction, or a downward direction as a whole (the rightward direction in the example of FIG. 32). Movement of the selection option cards 10 is then stopped or the movement speed is slowed to stop or decrease the extent of the modification control of the display state (10F in the example of FIG. 32). Accompanying the modification control, the selection option cards 10 surrounding a selection option card 10F move so as to avoid the selection option card 10F as illustrated in the lower part of FIG. 32. Conventionally known ideal image placement technology or the like may be employed in movement accompanying avoiding the selection option card 10.

In order to implement the movement of the selection option card 10 as described above, control information for changing the display position of each selection option card 10 with the passage of time, namely, control information for moving the selection option cards 10, is stored in the control information DB. FIG. 33 illustrates an example of a control information DB 416 in such a case. In the example of FIG. 33, the example illustrated specifies control information, for example, information that includes a movement direction and a movement speed such as "move a specific amount of pixels (for example, one pixel) in a specific direction (for example, in the positive direction of the x-axis) with each cycle".

Moreover, plural second display devices may be provided in each exemplary embodiment above. In such cases, a different background is displayed on each second display device. Then, when a selected selection option card selected from the first display device is forwarded to the second display device, forwarding is performed after selecting which second display device to forward to. This, for example, enables different visions to be displayed on different second display devices, such as a vision of a current state of affairs and a vision of future hopes.

In each exemplary embodiment above, handwritten notes and the like may be read by a scanner and displayed on the second display device in an electronic card format similar to that of the selection option cards. This enables information not included in the selection options expressed by the selection option cards to be reflected in the vision.

Although explanation has been given in each exemplary embodiment above regarding cases in which the first control device 120 (220, 320) controls display on the first display device 130 and the second control device 140 controls display on the second display device 150, there is no limitation thereto. For example, the management server 110 (210, 310) may control display on the first display device 130, the second display device 150. In such cases, each functional section of the first control device 120 (220, 320) and each functional section of the second control device 140 may be provided in the management server 110 (210, 310).

Note that the management section 111 (211, 311) of the management server 110 (210, 310), and the display controllers 121 (221, 321), 141 of each first control device 120 (220, 320) and each second control device 140 in each exemplary embodiment are examples of controllers of technology disclosed herein.

Although explanation has been given in each exemplary embodiment above regarding modes in which the management program 30, 30A, 30B, the first control program 50A, 50A, 50B, and the second control program 70 are pre-stored (installed) in the storage section 23, 43, 63, there is no limitation thereto. The program according to technology disclosed herein may be provided in a format recorded to a storage medium such as a CD-ROM, a DVD-ROM, or USB memory.

When user desires are extracted and products and services are provided according to their desires, only products and services that partially satisfy user desires can be provided in cases in which only fragmentary user desires are extracted. It is, therefore, important to extract a full account of desires, such as future visions and concepts drawn up by users using free imagination, without being swayed by the products and services being provided. However, work that strictly extracts such visions and concepts involve consulting, which entails time and costs.

In order to address this, various selection options that aid extraction of user desires are presented to the user by displaying keywords, illustrations, or the like; and the user chooses a selection option having contents that match their own desires. A conceivable method is one in which the provider of a product or service takes selection options chosen by users as material to consider in order to infer user desires, and provides a product or service conforming to user desires.

One aspect of technology disclosed herein enables plural selection options to be displayed so as to enable a user to be made aware of presence of various selection options without hindering a selection work by the user.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image control method, comprising:
   displaying on a display device a plurality of items of selection option information that are subject to a selection operation and cycling through modifications of a display state of the plurality of items within a predetermined period in accordance with predetermined values for modifying at least one of a display size, a display position, an angle, a color, a brightness, or a contrast for each of the plurality of items of selection option information in each cycle of the modifications in the predetermined period;
   acquiring detection information indicating a gaze region or a position of a user with respect to the display device;
   determining whether or not the gaze region of the user indicated by the acquired detection information is in a resting state, or whether or not the position of the user indicated by the acquired detection information is within a predetermined range; and
   by a processor, controlling stopping and resuming of the cycling of the modifications of the display state of at least a subset of the plurality of items displayed in a specific region of the display device in accordance with a determination result based on the detection information,
   wherein the controlling includes modifying the cycling through of the modifications in the display state of the plurality of items of the selection option information displayed in the specific region of the display device in accordance with the determination result based on the detection information.

2. The image control method of claim 1, wherein the controlling is performed such that the modifications in the display state of the plurality of items of the selection option information in a case in which the determination result indicates that the gaze region is in the resting state or indicates that a distance from the position of the user to the display device is within a predetermined first range of not greater than a first distance, is lesser than the modifications in the display state of the plurality of items of the selection option information in a case in which the determination result indicates that the gaze region is not in a resting state or indicates that the position of the user is outside of the first range.

3. The image control method of claim 2, wherein the controlling is performed such that the modifications in the display state of the plurality of items of the selection option information in a case in which the determination result indicates that the position of the user is outside of the first range and is within a second range not greater than a second distance that is greater than the first distance, is greater than the modifications in the display state of the plurality of items of the selection option information in a case in which the determination result indicates that the position of the user is outside of the second range.

4. The image control method of claim 1, wherein the specific region of the display device is set to the entire screen of the display device, or to a region on the display device corresponding to the gaze region or the position of the user.

5. The image control method of claim 1, further comprising displaying, on another display device, selection option information that has been subjected to a selection operation on the display device displaying the plurality of items of selection option information.

6. An image control device, comprising:
a memory: and
a processor coupled to the memory, the processor configured to:
  display on a display device a plurality of items of selection option information that are subject to a selection operation and cycling through modifications of a display state of the plurality of items within a predetermined period in accordance with predetermined values for modifying at least one of a display size, a display position, an angle, a color, a brightness, or a contrast for each of the plurality of items of selection option information in each cycle of the modifications in the predetermined period;
  acquire detection information indicating a gaze region or a position of a user with respect to the display device;
  determine whether or not the gaze region of the user indicated by the acquired detection information is in a resting state, or whether or not the position of the user indicated by the acquired detection information is within a predetermined range; and
  control stopping and resuming of the cycling of the modifications of the display state of at least a subset of the plurality of items displayed in a specific region of the display device in accordance with a determination result based on the detection information,
wherein the control by the processor includes modifying the cycling through of the modifications in the display state of the plurality of items of the selection option information displayed in the specific region of the display device in accordance with the determination result based on the detection information.

7. The image control device of claim 6, wherein the control by the processor is performed such that the modifications in the display state of the plurality of items of the selection option information in a case in which the determination result indicates that the gaze region is in the resting state or indicates that a distance from the position of the user to the display device is within a predetermined first range of not greater than a first distance, is lesser than the modifications in the display state of the plurality of items of the selection option information in a case in which the determination result indicates that the gaze region is not in a resting state or indicates that the position of the user is outside of the first range.

8. The image control device of claim 7, wherein the control by the processor is performed such that the modifications in the display state of the plurality of items of the selection option information in a case in which the determination result indicates that the position of the user is outside of the first range and is within a second range not greater than a second distance that is greater than the first distance, is greater than the modifications in the display state of the plurality of items of the selection option information in a case in which the determination result indicates that the position of the user is outside of the second range.

9. The image control device of claim 6, wherein the specific region of the display device is set to the entire screen of the display device, or to a region on the display device corresponding to the gaze region or the position of the user.

10. A non-transitory recording medium storing an image control program that is executable by a computer to perform a process, the process comprising:
  displaying on a display device a plurality of items of selection option information that are subject to a selection operation and cycling through modifications of a display state of the plurality of items within a predetermined period in accordance with predetermined values for modifying at least one of a display size, a display position, an angle, a color, a brightness, or a contrast for each of the plurality of items of selection option information in each cycle of the modifications in the predetermined period;
  acquiring detection information indicating a gaze region or a position of a user with respect to the display device;
  determining whether or not the gaze region of the user indicated by the acquired detection information is in a resting state, or whether or not the position of the user indicated by the acquired detection information is within a predetermined range; and
  controlling stopping and resuming of the cycling of the modifications of the display state of at least a subset of the plurality of items displayed in a specific region of the display device in accordance with a determination result based on the detection information,
wherein in the process, the controlling includes modifying the cycling through of the modifications in the display state of the plurality of items of the selection option information displayed in the specific region of the display device in accordance with the determination result based on the detection information.

11. The non-transitory recording medium of claim 10, wherein, in the process, the controlling is performed such that the modifications in the display state of the plurality of items of the selection option information in a case in which the determination result indicates that the gaze region is in the resting state or indicates that a distance from the position of the user to the display device is within a predetermined first range of not greater than a first distance, is lesser than the modifications in the display state of the plurality of items of the selection option information in a case in which the determination result indicates that the gaze region is not in a resting state or indicates that the position of the user is outside of the first range.

12. The non-transitory recording medium of claim 11, wherein, in the process, the controlling is performed such that the modifications in the display state of the plurality of items of the selection option information in a case in which the determination result indicates that the position of the user is outside of the first range and is within a second range not greater than a second distance that is greater than the first distance, is greater than the modifications in the display state of the plurality of items of the selection option information in a case in which the determination result indicates that the position of the user is outside of the second range.

13. The non-transitory recording medium of claim 10, wherein the specific region of the display device is set to the entire screen of the display device, or to a region on the display device corresponding to the gaze region or the position of the user.

\* \* \* \* \*